United States Patent
Kannas et al.

(10) Patent No.: US 12,229,786 B2
(45) Date of Patent: Feb. 18, 2025

(54) METHOD FOR IDENTIFYING AUTHENTICITY OF AN OBJECT

(71) Applicant: TRUEMED OY, Espoo (FI)

(72) Inventors: Tuomas Kannas, Espoo (FI); Oskari Heikel, Espoo (FI); Hemmo Latvala, Espoo (FI); Nicola Piccinini, Espoo (FI); Olli-Heikki Paloheimo, Espoo (FI)

(73) Assignee: TRUEMED OY, Espoo (FI)

( * ) Notice: Subject to any disclaimer, the term of this patent is extended or adjusted under 35 U.S.C. 154(b) by 337 days.

(21) Appl. No.: 17/787,607

(22) PCT Filed: Dec. 22, 2020

(86) PCT No.: PCT/FI2020/050863
§ 371 (c)(1),
(2) Date: Jun. 21, 2022

(87) PCT Pub. No.: WO2021/130413
PCT Pub. Date: Jul. 1, 2021

(65) Prior Publication Data
US 2022/0414902 A1   Dec. 29, 2022

(30) Foreign Application Priority Data
Dec. 23, 2019 (FI) .......................... 20196125

(51) Int. Cl.
 *G06V 20/00* (2022.01)
 *G06Q 30/018* (2023.01)
 (Continued)

(52) U.S. Cl.
 CPC .......... *G06Q 30/018* (2013.01); *G06T 7/337* (2017.01); *G06V 10/7515* (2022.01); *G06V 10/82* (2022.01); *G06V 20/95* (2022.01)

(58) Field of Classification Search
 CPC ............. G06Q 30/018; G06Q 30/0623; G06Q 30/0185; G06T 7/337; G06T 5/50;
 (Continued)

(56) References Cited

U.S. PATENT DOCUMENTS

| | | |
|---|---|---|
| 2006/0164682 A1 | 7/2006 | Lev |
| 2013/0004079 A1 | 1/2013 | Yamada et al. |

(Continued)

FOREIGN PATENT DOCUMENTS

| | | |
|---|---|---|
| GB | 2557417 A | 6/2018 |
| WO | 2014070958 A1 | 5/2014 |

(Continued)

OTHER PUBLICATIONS

Wu, J. et al. Spot the Difference by Object Detection. arXiv:1801.01051v1 [cs.CV]. In: arXiv.org, Cornell University Library [online], Jan. 3, 2018, pp. 1-10, [retrieved on Jun. 6, 2020]. Retrieved from <https://arxiv.org/abs/1801.01051v1>. XP080850289 abstract; sections 1, 3.1, 4.3.5; Figs. 1-4, 6, 10-11.

(Continued)

*Primary Examiner* — Aaron W Carter
(74) *Attorney, Agent, or Firm* — Robert P. Michal, Esq.; Carter, DeLuca & Farrell LLP

(57) ABSTRACT

A method for identifying authenticity of an object, the method includes maintaining, in an identification server system, a reference image of an original object, the reference image and provided to represent all equivalent original objects, receiving, in the identification server system, one or more input images of the object to be identified, and generating, by the identification server system, a target image from the one or more input images. The method further includes aligning, by the identification server system, the target image with the reference image and analysing, by the identification server system, the target image in relation (Continued)

to the aligned reference image for identifying authenticity of the object.

17 Claims, 21 Drawing Sheets

(51) Int. Cl.
  *G06T 7/33* (2017.01)
  *G06V 10/75* (2022.01)
  *G06V 10/82* (2022.01)
(58) Field of Classification Search
  CPC .... G06T 7/001; G06V 10/7515; G06V 10/82; G06V 20/95; G06V 10/24; G06V 10/754; G06F 18/2413; G06F 16/55; G06N 3/045
  See application file for complete search history.

(56) References Cited

U.S. PATENT DOCUMENTS

| | | | |
|---|---|---|---|
| 2015/0229840 A1 | 8/2015 | Sawai et al. | |
| 2016/0300107 A1 | 10/2016 | Callegari et al. | |
| 2018/0129859 A1 | 5/2018 | Krishnapura et al. | |
| 2018/0307942 A1 | 10/2018 | Pereira et al. | |
| 2018/0349695 A1* | 12/2018 | Le Henaff | G06V 10/225 |
| 2019/0213408 A1* | 7/2019 | Cali | G06V 30/414 |
| 2019/0286902 A1 | 9/2019 | Rowe et al. | |
| 2020/0120233 A1* | 4/2020 | Annunziata | G06N 3/045 |
| 2020/0226772 A1* | 7/2020 | Xiang | G06T 7/42 |
| 2021/0357705 A1* | 11/2021 | Sung | G06V 10/454 |
| 2021/0374476 A1* | 12/2021 | Heikel | G06N 3/045 |
| 2022/0124257 A1* | 4/2022 | Zhao | G06N 3/08 |
| 2022/0261820 A1* | 8/2022 | Hemminger | G06N 3/0464 |
| 2022/0319210 A1* | 10/2022 | Abner | G06V 30/18086 |
| 2022/0351215 A1* | 11/2022 | Ramasubramanian | G06T 7/77 |
| 2022/0414902 A1* | 12/2022 | Kannas | G06Q 30/0623 |
| 2023/0005122 A1* | 1/2023 | Peng | G06N 3/084 |
| 2023/0065074 A1* | 3/2023 | Rafferty | G06V 30/1444 |
| 2023/0325959 A1* | 10/2023 | He | G06T 3/40 382/100 |

FOREIGN PATENT DOCUMENTS

| | | |
|---|---|---|
| WO | 2014092741 A1 | 6/2014 |
| WO | 2018022197 A1 | 2/2018 |
| WO | 2019072492 A1 | 4/2019 |

OTHER PUBLICATIONS

Finnish Search Report issued by the Finnish Patent and Registration Office in relation to Finnish Application No. 20196125 dated Jun. 22, 2020 (2 pages).

International Search Report issued by the Finnish Patent and Registration Office acting as the International Searching Authority in relation to International Application No. PCT/FI2020/050863 dated Mar. 12, 2021 (6 pages).

Written Opinion of the International Searching Authority issued by the Finnish Patent and Registration Office acting as the International Searching Authority in relation to International Application No. PCT/FI2020/050863 dated Mar. 12, 2021 (10 pages).

Xiang, T.-Z. et al. Image Stitching by Line-guided Local Warping with Global Similarity Constraint. In: Cornell University Library [online], Oct. 30, 2017, pp. 1-31, [retrieved on Mar. 10, 2020]. Retrieved from <https://arxiv.org/abs/1702.07935v2>, XP081294027 sections 2-3; Figs. 2, 7.

\* cited by examiner

METHOD FOR IDENTIFYING AUTHENTICITY OF AN OBJECT

CROSS-REFERENCE TO RELATED APPLICATIONS

This application is a national phase entry under 35 U.S.C. 371 of PCT International Application No. PCT/FI2020/050863 filed Dec. 22, 2020, which claims priority to Finnish Patent Application No. 20196125, filed Dec. 23, 2019, the disclosure of each of these applications is expressly incorporated herein by reference in their entirety.

FIELD OF THE INVENTION

The present invention relates to method for identifying authenticity of an object.

BACKGROUND OF THE INVENTION

Counterfeit products are a global problem which affect both individual persons, companies and societies. Counterfeit products cause financial losses to companies manufacturing original products. However, there are also far more significant problems relating to counterfeit products. For example, counterfeit food products or counterfeit medicines may cause severe health problems to humans, societies and also to animals. In the prior art two different ways have been used to identify authenticity of an object. According to first alternative, each original object is photographed or otherwise analysed or documented during manufacturing. Then, later throughout the supply chain, for example in a store the object which is sold may be again photographed or analysed. The photograph or analysing results from the store is then matched to the photograph or analysing result or documents from the manufacturing for finding the exact match and evidence. Accordingly, on this first alternative each object is identified one by one. According to second alternative, the object or the packaging of the object is provided with identifiers or tags representing authenticity of the object. The identifiers or tags may be then analysed for identifying the authenticity of the object.

One of the problems associated with the first alterative of the prior art is that each object has to be individually matched one by one to an authentic object. This could be feasible solution for products having limited manufacturing numbers. However, when the manufacturing number of similar products is large, for example hundreds of thousands or millions, or the supply chain complex, this solution becomes very ponderous and difficult. One of the problems associated with the second alternative of the prior art is that the identifiers or tags could be also counterfeited making the identifying of original products difficult. Furthermore, one disadvantage of both the first and second alternative is that they both require making alterations or extra process steps to the manufacturing and supply of the products. This is not desirable in efficient manufacturing processes.

BRIEF DESCRIPTION OF THE INVENTION

An object of the present invention is to provide a method to solve or at least alleviate disadvantages of the prior art. The preferred embodiments of the invention are disclosed in the dependent claims.

The present invention is based on an idea of providing a method for identifying authenticity of an object. The method comprises steps a) maintaining, in an identification server system, a reference image of an original object, the reference image is provided to represent an equivalent original object;
b) receiving, in the identification server system, one or more input images of the object to be identified;
c) generating, by the identification server system, a target image from the at least one of the one or more input images;
d) aligning, by the identification server system, at least one of the one or more input images to the reference image by distorting the target image; e) analysing, by the identification server system, the aligned target image in relation to the reference image for identifying authenticity of the object.

According to the present invention, the target image is image aligned to the reference image such that the target image is modified to match the reference image. The image alignment of the target image is carried out in relation to the reference image by distorting the target image. This enables comparing or analysing the target image in relation to the reference image accurately and reliably for identifying authenticity of the object.

In the context of this application, aligning by distorting means that distortions and/or defects in the target image are compensated by aligning the target image to the reference image such that the target image corresponds the reference image as well as possible. Therefore, during aligning distortions from taking the input image and defects in the object itself are compensated.

Generally distorting means generating deviations from rectilinear projection in the image. Therefore, image distorting means changing the spacial relationship between parts of the image.

When an image is captured, the image may look distorted relative to the object. Accordingly, the image turned out different from what was seen with eyes. This is called image distortion. Distortion, in digital imaging, is the deviation of an observed pixel from its predicted coordinate in a 2D plane. This leads to a more curvilinear or distorted appearance that looks unnatural to the eye.

Thus, distortion is a term used to define a series of aberrations that occur with certain optical choices and shooting perspectives. There are generally two types of distortion: optical and perspective. Each contain various aberrations. Optical distortion occurs when distortions are created in an image based on lens type. The optical distortions comprise at least barrel distortion, pincushion distortion, moustache distortion and lens type distortion.

Barrel distortion occurs when straight lines in an image start to bend outward from the centre, creating a barrel-like effect. Pincushion distortion occurs when straight lines in an image start to bend inward from the edges of the frame. Moustache distortion is a combination of pincushion and barrel distortion, where the straight lines of an image bend outward from the centre, and then inward from the corners of the frame. Lens type distortion occurs with rectilinear lenses, such as wide-angle primes, tend to make lines in an image appear straight. On the other hand, curvilinear lenses, such as fisheye lenses, bend straight lines in an image.

Perspective distortion means that objects in an image can appear larger or smaller than they actually are, based on the distance between the object and the lens.

According to the above mentioned, in the context of this application aligning means distorting the input image(s) or the target image to compensate the image distortions caused by or generated during taking the input image(s). Therefore, aligning the input image or the target image comprises changing the spacial relationship between parts, locations, areas or pixels of the input image or the target image.

In one embodiment, in the step d) aligning, by the identification server system, the target image to the reference image by distorting the comprises adjusting the target image to match the reference image. Accordingly, the target image is adjusted or distorted in relation to the reference image such that the target image matches the reference image.

For example, in one embodiment, in the step d) aligning, by the identification server system, the target image to the reference image by distorting the target images comprises adjusting dimensions of the target image to match the dimensions of the reference image. Accordingly, dimensions of the target image are adjusted in relation to the reference image such that the dimensions of the target image match the dimensions of the reference image. The dimensions mean the internal dimensions of the target image.

Then, the target image has matching dimensions with the reference image enabling accurate analysing and comparing of the target image with the reference image.

In one embodiment, the method further comprises step f) carried out before step e). The step f) comprises defining, by the identification server system, one or more sub-parts in the aligned target image, and the step e) comprises analysing, by the identification server system, at least one of the one or more sub-parts of the aligned target image in relation to at least one corresponding sub-part of the reference image for identifying authenticity of the object. Accordingly, in this embodiment one or more sub-parts of the target image may be analysed in relation to the one or more corresponding sub-parts of the reference image. Thus, the whole target image does not need to be analysed and the analysing may be carried out efficiently and quickly.

In another embodiment, the method further comprises step f) carried out before step e). The step f) comprises defining, by the identification server system, one or more sub-parts in the target image. The step d) comprises aligning, by the identification server system, at least one of the one or more sub-parts of the target image to at least one corresponding sub-part of the reference image. Further, the step e) comprises analysing, by the identification server system, the at least one of the one or more aligned sub-parts of the target image in relation to at the least one corresponding sub-part of the reference image for identifying authenticity of the object. Thus, the whole target image does not need to be aligned but only the sub-parts to be analysed.

In one embodiment, the step f) comprises dividing, by the identification server system, the aligned target image into two or more sub-parts.

In another embodiment, the step f) comprises maintaining, in the identification server system, the reference image of the original object. The reference image is pre-divided into two or more sub-parts. The step f) further comprises dividing, by the identification server system, the aligned target image into two or more sub-parts based on the pre-divided sub-parts of the reference image. The target image is aligned in step d) before the step f). Accordingly, the aligned target image is divided to the two or more sub-parts based on the pre-divided reference image and thus similarly as the reference image.

In a further embodiment, the step f) comprises dividing, by the identification server system, the reference image into two or more sub-parts, and dividing, by the identification server system, the aligned target image into two or more sub-parts based on the sub-parts of the reference image. In this embodiment, the reference image is first divided into two or more sub-parts, preferably based on situation or as desired, and the aligned target image is divided into two or more sub-parts similarly or based on the sub-parts of the reference image In one embodiment, the step e) comprises comparing, by the identification server system, the aligned target image to the reference image by utilizing statistical methods for identifying authenticity of the object. Utilizing statistical methods in step e) is fast and efficient analysis method requiring moderate amount is calculation capacity.

In another embodiment, the step e) comprises comparing, by the identification server system, the at least one of the one or more aligned sub-parts of the target image to the at least one corresponding sub-part of the reference image by utilizing statistical methods for identifying authenticity of the object. Analysing sub-parts with statistical methods enables even more efficient analysis due to reduced amount of data to be analysed.

In a further embodiment, the step e) comprises maintaining, in the identification server system, a machine learning identification algorithm or an identification neural network, and comparing, by the identification server system, the aligned target image to the reference image by utilizing the machine learning identification algorithm or the identification neural network. The machine learning identification algorithm or the identification neural network is trained to carry out the analysing. Further, the machine learning identification algorithm or the identification neural network may be trained continuously for enhancing the accuracy of the analysing.

In a yet further embodiment, the step e) comprises maintaining, in the identification server system, a machine learning identification algorithm or an identification neural network, and comparing, by the identification server system, the at least one of the one or more aligned sub-parts of the target image to the at least one corresponding sub-part of the reference image by utilizing machine learning identification algorithm or the identification neural network. The machine learning identification algorithm or the identification neural network may be trained to analyse one or more sub-parts of the target image. Thus, the machine learning identification algorithm or the identification neural network may carry out the analysis efficiently and more accurately to a sub-part. Further, machine learning identification algorithm or the identification neural network may be in some embodiments specific for a certain sub-part or each sub-part may comprise be provided with a specific machine learning identification algorithm or the identification neural network.

In one embodiment, the step e) comprises providing, in the identification server system, a first machine learning identification algorithm trained to determine differences between the aligned target image and the reference image, and a second machine learning identification algorithm specific to the reference image and trained to analyse the differences determined by the first machine learning identification algorithm in relation to the reference image. The step e) comprises processing, by the identification server system, the aligned target image and the aligned reference image with the first machine learning identification algorithm, and generating, by the identification server system, a first difference vector by utilizing the first machine learning identification algorithm. The step e) further comprises processing, by the identification server system, the first difference vector with the second machine learning identification algorithm specific to the reference image for identifying authenticity of the object. Not all differences in the target image and in the reference image are severe, or they do not relate to authenticity evaluation of the object. This embodiment enables analysing the authenticity taking into account different types of the differences by utilizing two machine learning algorithms. Dividing the analysis to two machine learning algorithms enables efficient analysis.

In an alternative embodiment, step e) comprises providing, in the identification server system, a first identification neural network trained to determine differences between the aligned target image and the reference image, and a second identification neural network specific to the reference image and trained to analyse the differences determined by the first identification neural network in relation to the reference image. The step e) comprises processing, by the identification server system, the aligned target image and the aligned reference image with the first identification neural network and generating, by the identification server system, a first difference vector by utilizing the first identification neural network. The step e) further comprises processing, by the identification server system, the first difference vector with the second identification neural network specific to the reference image for identifying authenticity of the object. This embodiment enables analysing the authenticity taking into account different types of the differences by utilizing two neural networks. Dividing the analysis to two neural networks enables efficient analysis.

In one embodiment, the step e) comprises providing, in the identification server system, a first machine learning identification algorithm trained to determine differences between an aligned sub-part of the target image and a corresponding sub-part of the reference image, and one or more second machine learning identification algorithms specific for the one or more sub-parts of the reference image and trained to analyse the differences determined by the first machine learning identification algorithm in relation to each of the one or more sub-parts of the reference image. The step e) comprises processing, by the identification server system, one or more aligned sub-parts of the target image and one or more corresponding sub-parts of the reference image, respectively, with the first machine learning identification algorithm, and generating, by the identification server system, one or more difference vectors by utilizing the first machine learning identification algorithm, each of the one or more difference vectors being specific to one sub-part of the reference image. The step e) further comprises processing, by the identification server system, the one or more difference vectors with the one or more second machine learning identification algorithms specific to the one or more sub-parts of the reference image, respectively, for identifying authenticity of the object. This embodiment enables analysing the authenticity taking into account different types of the differences by utilizing two machine learning algorithms and focusing on one or more subparts of the target image. Dividing the analysis to two machine learning algorithms and to the one or more sub-parts enables even more efficient analysis.

In another embodiment, the step e) comprises providing, in the identification server system, a first identification neural network trained to determine differences between an aligned sub-part of the target image and a corresponding sub-part of the reference image, and one or more second identification neural networks specific for the one or more sub-parts of the reference image and trained to analyse the differences determined by the first identification neural network in relation to each of the one or more sub-parts of the reference image. The step e) comprises processing, by the identification server system, one or more aligned sub-parts of the target image and one or more corresponding sub-parts of the reference image, respectively, with the first identification neural network and generating, by the identification server system, one or more difference vectors by utilizing the first identification neural network, each of the one or more difference vectors being specific to one sub-part of the reference image. The step e) further comprises processing, by the identification server system, the one or more difference vectors with the one or more second identification neural networks specific to the one or more sub-parts of the reference image, respectively, for identifying authenticity of the object. This embodiment enables analysing the authenticity taking into account different types of the differences by utilizing two neural networks and focusing on one or more subparts of the target image. Dividing the analysis to two neural networks and to the one or more sub-parts enables even more efficient analysis.

In some embodiments, the machine learning algorithm may comprise a network based machine learning algorithm, or a model based machine learning algorithm, or a non-parametric machine learning algorithm. The neural network may be any suitable artificial neural network.

In one embodiment of the present invention, the aligning in step d) comprises image aligning comprising recognizing, by the identification server system, corresponding locations in the target image and in the reference image, and aligning, by the identification server system, the corresponding locations in the target image and in the reference image to each other by distorting the target image. Accordingly, the method may comprise aligning one or more of the corresponding locations and alignment may be carried out accurately and efficiently for providing high quality analysis of authenticity.

In another embodiment, the step d) comprises recognizing, by the identification server system, corresponding locations in at least one of the one or more sub-parts of the target image and in at least one corresponding sub-part of the reference image, and aligning, by the identification server system, the corresponding locations in the at least one of the one or more sub-parts of the target image and in the at least one corresponding sub-part of the reference image to each other by distorting the at least one of the one or more sub-parts of the target image. Accordingly, the method may comprise aligning one or more of the corresponding locations of one or more sub-parts and alignment may be carried out accurately and efficiently for providing high quality analysis of authenticity.

In one embodiment, the aligning in step d) comprises image aligning and associating, by the identification server system, a reference image grid on the reference image, associating, by the identification server system, a target image grid on the target image, and aligning, by the identification server system, the target image to the reference image by adjusting the target image grid in relation to the reference image for aligning the target image with the reference image. Aligning the target image to the reference image by utilizing the target image grid and the reference image grid enables aligning the target image to the reference image in simplified manner providing efficient processing.

In another embodiment, the aligning in step d) comprises image aligning and associating, by the identification server system, a reference image grid on the reference image, associating, by the identification server system, a target image grid on the target image, and aligning, by the identification server system, the target image to the reference image by distorting the target image grid in relation to the reference image for aligning the target image with the reference image. Aligning the target image to the reference image by utilizing the target image grid and the reference image grid enables aligning the target image to the reference image in simplified manner providing efficient processing.

In one embodiment of the present invention, the reference image grid comprises reference grid points and the target image grid comprises target grid points, and that the step d) aligning, by the identification server system, the target image to the reference image further comprises adjusting, by the identification server system, the target grid points of the target image grid in relation to the corresponding reference grid points of the reference image by moving the target grid points of the target image grid for distorting the target image. The aligning is carried out by moving the target grid points of the target image grid individually in relation to each other and in relation to the reference grid points of the reference image grid. Thus, the target image and the target image grid is distorted and becomes image aligned to the reference image.

In another embodiment the step d) aligning, by the identification server system, the target image to the reference image further comprises adjusting, by the identification server system, the target grid points of the target image grid in relation to each other and in relation to the corresponding reference grid points of the reference image by moving the target grid points of the target image grid for distorting the target image.

In one embodiment, the step d) aligning, by the identification server system, comprises iteratively aligning the target image to the reference image by iteratively moving the target grid points of the target image grid for distorting the target image. Each target grid point of the target image grid may be individually moved in relation to other target grid points of the target image grid and in relation to the reference grid points of the reference image grid. This is carried out in iterative process by moving the target grid points of the target image grid two or more times for providing accurate aligning.

In another embodiment, the step d) aligning, by the identification server system, the target image to the reference image further comprises aligning, by the identification server system, the target image to the reference image by moving the target grid points of the target image grid for distorting the target image. The step d) further comprises verifying, by the identification server system, aligning of the target image to the reference image, and iteratively aligning, by the identification server system, the target image to the reference image by iteratively moving the target grid points of the target image grid for distorting the target. The iterative moving of the target grid points of the target image grid may comprise verifying or evaluating the alignment of the target image to the reference image and repeating the moving, or iterative moving, based on the verifying. The verifying may comprise carrying out step e) for the analysing. The step e) may be carried out between iterative aligning steps d).

In one embodiment, the step d) aligning, by the identification server system, the target image to the reference image comprises scaling down, by the identification server system, the reference image together with the reference image grid for forming a down scaled reference image with a down scaled reference image grid and aligning, by the identification server system, the target image to the down scaled reference image for providing an initial image alignment of the target image to the reference image. The step d) further comprises scaling up, by the identification server system, the down scaled reference image together with the down scaled reference image grid for forming a first up scaled reference image with a first up scaled reference image grid, and aligning, by the identification server system, the target image to the first up scaled reference image for providing a first image alignment of the target image to the reference image. The iterative aligning is carried out with the down scaling of the reference image and the reference image grid and the up scaling the reference image and the reference image grid, and aligning the target image two or more times successively to the reference image which is scaled up between the successive alignments.

In another embodiment, the step d) aligning, by the identification server system, the target image to the reference image comprises scaling down, by the identification server system, the reference image together with the reference image grid for forming a down scaled reference image with a down scaled reference image grid, and aligning, by the identification server system, the target image to the down scaled reference image for providing an initial image alignment of the target image to the reference image. The step d) further comprises scaling up, by the identification server system, the down scaled reference image together with the down scaled reference image grid for forming a first up scaled reference image with a first up scaled reference image grid, aligning, by the identification server system, the target image to the first up scaled reference image for providing a first image alignment of the target image to the reference image, and repeating one or more times, by the identification server system, the up scaling of the reference image together with the reference image grid and aligning the target image to the up scaled reference image for providing a first image alignment of the target image to the reference image. Accordingly, the aligning is gradually provided more accurate.

In one embodiment, the step d) aligning, by the identification server system, the target image to the reference image further comprises scaling down, by the identification server system, the reference image together with the reference image grid for forming a down scaled reference image with a down scaled reference image grid, aligning, by the identification server system, the target image to the down scaled reference image by moving the target grid points of the target image grid. The step d) further comprises scaling up, by the identification server system, the down scaled reference image together with the down scaled reference image grid for forming a first up scaled reference image with a first up scaled reference image grid, and aligning, by the identification server system, the target image to the first up scaled reference image by moving the grid points of the target image grid. The down scaling and then up scaling provide gradually and iteratively providing more accurate the alignment of the target image to the reference image. Thus, high quality alignment is achieved efficiently by moving the target grid points of the target image grid.

In another embodiment, the step d) aligning, by the identification server system, the target image to the reference image further comprises scaling down, by the identification server system, the reference image together with the reference image grid for forming a down scaled reference image with a down scaled reference image grid, and aligning, by the identification server system, the target image to the mag the down scaled reference image by moving the target grid points of the target image grid. The step) further comprises scaling up, by the identification server system, the down scaled reference image together with the down scaled reference image grid for forming a first up scaled reference image with a first up scaled reference image grid, aligning, by the identification server system, the target image to the first up scaled reference by moving the target grid points of the target image grid, and repeating one or more times, by the identification server system, the up scaling of the reference image together with the reference image grid and aligning the target image to the up scaled reference image for providing a first image alignment of the target image to the reference image. Accordingly, the aligning is gradually provided more accurate by up scaling the reference image and the reference image grid and moving the target grip points of the target image grid for distorting the target image.

In some embodiments, the step e) of analysing may be carried out between the up scaling and alignment of the reference image. Further each alignment to differently scaled reference image may comprise alignment by moving or iteratively moving the target grid points.

In one embodiment, the step b) comprises receiving, in the identification server system, two or more input images of the object to be identified, and the step c) comprises selecting, by the identification server system, one of the two or more input images as the target image. Accordingly, the one of the two or more input images is selected as the target image.

In another embodiment, the step b) comprises receiving, in the identification server system, two or more input images of the object to be identified, the step c) comprises comparing, by the identification server system, the two or more input images to the reference image, and the step c) further comprises selecting, by the identification server system, one of the two or more input images as the target image based on the comparison. Accordingly, selecting is carried out by comparing the input images to the reference image and selecting the input image having best match with the reference image as the target image. Thus, the most promising input image for identifying the authenticity of the object is chosen for high quality identification result.

In one embodiment, the step b) comprises receiving, in the identification server system, two or more input images of the object to be identified, the step c) comprises aligning, by the identification server system, at least two of the two or more input images with respect to the reference image, and generating, by the identification server system, the target image by combining the at least two of the two or more aligned input images as the target image. Accordingly, the target image is generated from two or more input images by combining the two or more target images. Thus, a high-quality target image may be generated by utilizing most promising parts of each of the two or more input images.

In another embodiment, the step b) comprises receiving, in the identification server system, two or more input images of the object to be identified, and the step c) comprises selecting one of the two or more input images as primary input image, aligning, by the identification server system, at least one of the two or more input images with respect to the primary input image, and generating, by the identification server system, the target image by combining the at least one of the two or more aligned input images and the primary input image as the target image. Accordingly, the target image is generated from two or more input aligned input images. Thus, a high-quality target image may be generated by utilizing most promising parts of each of the two or more input images.

The aligning of the at least one input image to the primary input image is carried out similar manner as disclosed above or by according to any of the above mentioned methods and alternative concerning aligning the input image or the target image to the reference image.

In one embodiment, the step b) comprises receiving, in the identification server system, two or more input images of the object to be identified. The step c) comprises aligning, by the identification server system, at least two of the two or more input images with to one or the primary input image, dividing, by the identification server system, at least two of the two or more input images into two or more sub-parts, selecting, by the identification server system, at least two of the two or more sub-parts, and generating, by the identification server system, the target image by combining the selected sub-parts as the target image. Accordingly, each input image may be divided into two or more sub-parts. One, or the most promising, of the corresponding sub-parts of the two or more input images is selected to the target image. Thus, the target image is composed of the most promising sub-parts of the two or more input images.

In another embodiment, the step b) comprises receiving, in the identification server system, two or more input images of the object to be identified. The step c) comprises aligning, by the identification server system, at least two of the two or more input images with to one or the primary input image, dividing, by the identification server system, the at least two of the two or more input images into two or more sub-parts, comparing, by the identification server system, the two or more sub-parts of the input images to corresponding sub-parts of the reference image, selecting, by the identification server system, at least two of the two or more sub-parts based on the comparison, and generating, by the identification server system, the target image by combining the selected sub-parts as the target image. Accordingly, the target image is generated from two or more input images by combining the two or more input images. Thus, a high-quality target image may be generated by utilizing most promising parts of each of the two or more input images based on the sub-parts to corresponding sub-parts of the input images and/or to the reference image. Accordingly, each input image may be divided into two or more sub-parts. Accordingly, the selected sub-parts are merged together to form the target image.

In one embodiment, the step c) or d) comprises extracting, by the identification server system, an input object image from the one or more input images or from the target image, the target image consisting of the input object image, the input object image conforming contour of the object. Accordingly, the generated target image comprises only image of the object and other parts of the input images are removed. Thus, excessive parts of the input images or the target image do not affect the identification of authenticity.

In another embodiment, extracting, by the identification server system, an input object image from the one or more input images or from the target image and removing, by the identification server system, the background for forming the target image, the target image consisting of the input object image, the input object image conforming contour of the object. Accordingly, the generated target image comprises only image of the object and the background of the input images or the target image is removed. Thus, the background of the input images or the target image does not affect the identification of authenticity.

In one embodiment of the present invention, the step c) comprises size aligning, by the identification server system, the one or more input images to the reference image.

In another embodiment, the step c) or d) comprises size aligning, by the identification server system, the target image to the reference image.

Size aligning means changing, increasing or decreasing, the pixel size of the input images or the target image such that the size matches the size of the reference image.

In one embodiment, the step c) comprises color aligning, by the identification server system, the one or more input images to the reference image.

In another embodiment, the step c) or d) comprises color aligning, by the identification server system, the target image to the reference image.

Color aligning means changing colors of the input images or the target image to match each other, or the reference image or each other and the reference image.

In one embodiment, the method further comprises before step e) comprising excluding, by the identification server system, a predetermined area of the aligned target image from the analysing of the aligned target image in relation to the reference image. Accordingly, unwanted or changing parts or areas of the target image may be excluded from the analysing of the authenticity. Thus, for example areas comprising manufacturing date or the like changing information or features are excluded from the analysing. This changing information does not affect the analysing.

In another embodiment, the method further comprises before step e) comprising applying, by the identification server system, a mask on a predetermined area of the aligned target image and on a corresponding predetermined area of the reference image for excluding the predetermined area from the analysing of the aligned target image in relation to the reference image. Accordingly, the mask excludes the predetermined area from the analysing.

An advantage of the invention is that identifying the authenticity is based on analysing the images of the object to be identified in relation to the reference image of the original object. Further, in the present invention the target image to be analysed in relation to reference image is image aligned to the reference image such that the analysis or comparison is as accurate as possible. Accordingly, in the present invention the target image which is analysed in relation to the reference image is provided to correspond the reference image as much as possible. This means that the target image is provided to be as good match with the reference image as possible such that the reliable and high quality identification of authenticity is achieved.

BRIEF DESCRIPTION OF THE DRAWINGS

The invention is described in detail by means of specific embodiments with reference to the enclosed drawings, in which.

DETAILED DESCRIPTION OF THE INVENTION

The invention and its embodiments are not specific to the particular information technology systems, communications systems and access networks, but it will be appreciated that the present invention and its embodiments have application in many system types and may, for example, be applied in a circuit switched domain, e.g., in GSM (Global System for Mobile Communications) digital cellular communication system, in a packet switched domain, e.g. in the UMTS (Universal Mobile Telecommunications System) system, the LTE (Long Term Evolution), or 5G NR (New Radio) standards standardized by the 3GPP (3G Partnership Project), and e.g. in networks according to the IEEE 802.11 standards: WLAN (Wireless Local Area networks), HomeRF (Radio Frequency) or BRAN (Broadband Radio Access Networks) specifications (HIPERLAN1 and 2, HIPERACCESS). The invention and its embodiments can also be applied in ad hoc communications systems, such as an IrDA (Infrared Data Association) network or a Bluetooth network. In other words, the basic principles of the invention can be employed in combination with, between and/or within any mobile communications systems of 2nd, 2,5th, 3rd, 4th and 5th (and beyond) generation, such as GSM, GPRS (General Packet Radio Service), TETRA (Terrestrial Trunked Radio), UMTS systems, HSPA (High Speed Packet Access) systems e.g. in WCDMA (Wideband Code Division Multiple Access) technology, and PLMN (Public Land Mobile Network) systems.

Communications technology using IP (Internet Protocol) protocol can be, e.g., the GAN technology (General Access Network), UMA (Unlicensed Mobile Access) technology, the VoIP (Voice over Internet Protocol) technology, peer-to-peer networks technology, ad hoc networks technology and other IP protocol technology. Different IP protocol versions or combinations thereof can be used.

Figure 1:
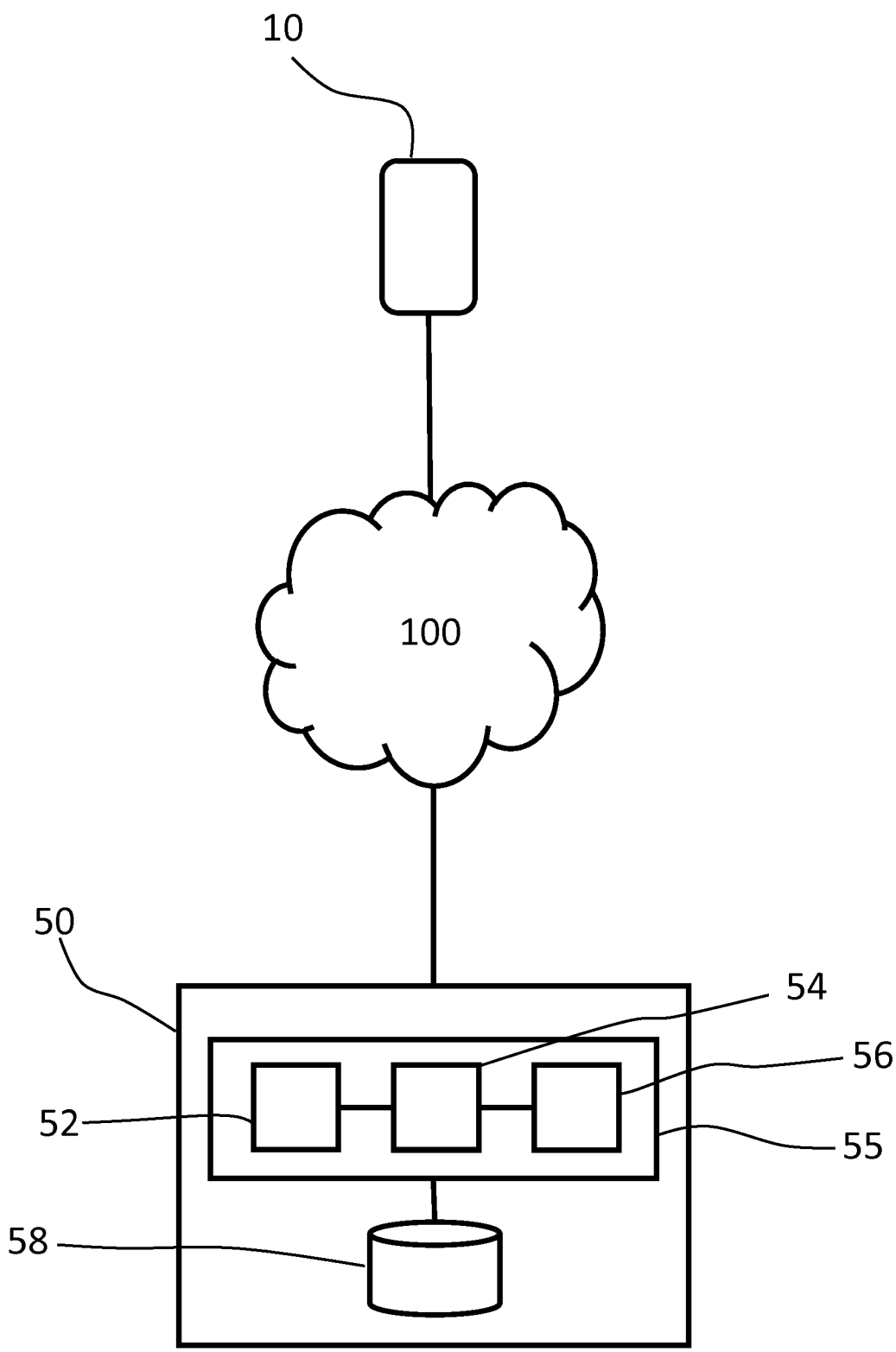
FIG. 1 shows schematically one embodiment of an identification system for carrying out the method of the present invention.

An architecture of a communications system to which embodiments of the invention may be applied is illustrated in FIG. 1. FIG. 1 illustrates a simplified system architecture only showing some elements and functional entities, all being logical units whose implementation may differ from what is shown. The connections shown in the figures are logical connections; the actual physical connections may be different. It is apparent to a person skilled in the art that the systems also comprise other functions and structures.

According to the above mentioned, the present invention is not limited any known or future systems or device or service, but may be utilized in any systems by following method according to the present invention.

FIG. 1 illustrates an identification system in which a user may connect to an identification server system 50 by using user a device 10 via a communications network 100. It should be noted that FIG. 1 presents a simplified version of the identification system and that in other embodiments, an unlimited number of users may be able to connect to the identification server system 50 via the communications network 100.

The communications network 100 may comprise one or more wireless networks, wherein a wireless network may be based on any mobile system, such as GSM, GPRS, LTE, 4G, 5G and beyond, and a wireless local area network, such as Wi-Fi. Furthermore, the communications network 100 may comprise one or more fixed networks or the Internet.

The identification server system 50 may comprise at least one identification server connected to an identification database 58. The identification server system 50 may also comprise one or more other network devices (not shown), such as a terminal device, a server and/or a database devices. The identification server system 50 is configured to communicate with the one or more user devices 10 via the communications network 100. The identification server system 50 or server and the identification database 58 may form a single database server, that is, a combination of a data storage (database) and a data management system, as in FIG. 1, or they may be separate entities. The data storage may be any kind of conventional or future data repository, including distributed and/or centralised storing of data, a cloud-based storage in a cloud environment (i.e., a computing cloud), managed by any suitable data management system. The detailed implementation of the data storage is irrelevant to the invention, and therefore not described in detail. In addition to or instead of the identification database 58, other parts of the identification server system 50 may also be implemented as distributed server system comprising two or more separate servers or as a computing cloud comprising one or more cloud servers. In some embodiments, the identification server system 50 may be a fully cloud-based server system. Further, it should be appreciated that the location of the identification server system 50 is irrelevant to the invention. The identification server system 50 may be operated and maintained using one or more other network devices in the system or using a terminal device (not shown) via the communications network 100. The identification server system 50 may also comprise one or more user devices.

In some embodiments, the identification server system 50 is integral to the user device 10 and provided as internal server system to the user device 10. Further, in these embodiments, the communications network 100 is implemented as internal communication network or components in the user device 10, such as a wireless or wire communication network or connection in the user device.

The identification server system 50 may also comprise a processing module 52. The processing module 52 is coupled to or otherwise has access to a memory module 54. The processing module 52 and the memory module 54 may form the identification server, or at least part of it. The identification server, or the processing module 52 and/or the memory module 54, has access to the identification database 58. The processing module 52 may be configured to carry out instructions of an identification applications or units by utilizing instructions of the identification application. The identification server system 50 may comprise an identification unit 56 which may be the identification application. The identification application 56 may be stored in the memory module 54 of the identification server system 50. The identification application or unit 56 may comprise the instructions of operating the identification application. Thus, the processing module 52 may be configured to carry out the instructions of the identification application.

The processing module 52 may comprise one or more processing units or central processing units (CPU) or the like computing units. The present invention is not restricted to any kind of processing unit or any number of processing units. The memory module 54 may comprise non-transitory computer-readable storage medium or a computer-readable storage device. In some embodiments, the memory module 54 may comprise a temporary memory, meaning that a primary purpose of memory module 54 may not be long-term storage. The memory module 54 may also refer to a volatile memory, meaning that memory module 54 does not maintain stored contents when the memory module 54 is not receiving power. Examples of volatile memories include random access memories (RAM), dynamic random access memories (DRAM), static random access memories (SRAM), and other forms of volatile memories known in the art. In some examples, the memory module 54 is used to store program instructions for execution by the processing module 52, for example the identification application. The memory module 54, in one embodiment, may be used by software (e.g., an operating system) or applications, such as a software, firmware, or middleware. The memory module 54 may comprise for example operating system or software application, the identification application, comprising at least part of the instructions for executing the method of the present invention. Accordingly, the identification unit 56 of the identification server system 50 comprises the identification application and it may be separate application unit, as shown in FIG. 1, or alternatively is may a separate application unit.

The processing module 52, the memory module 54 and the identification unit 56 together form an identification module 55 in the identification server system 50.

It should be noted, that the identification database 58 may also configured to comprise software application, the identification application, comprising at least part of the instructions for executing the method of the present invention.

The identification database 58 may maintain information of one or more original objects and one or more reference images of one or more original objects. The identification database 58 may also maintain information of one or more user accounts of a plurality of users and/or information uploaded to the server system 50 via said user accounts or user devices 10. The identification database 58 may comprise one or more storage devices. The storage devices may also include one or more transitory or non-transitory computer-readable storage media and/or computer-readable storage devices. In some embodiments, storage devices may be configured to store greater amounts of information than memory module 54. Storage devices may further be configured for long-term storage of information. In some examples, the storage devices comprise non-volatile storage elements. Examples of such non-volatile storage elements include magnetic hard discs, optical discs, solid-state discs, flash memories, forms of electrically programmable memories (EPROMs) or electrically erasable and programmable memories (EEPROMs), and other forms of non-volatile memories known in the art. In one embodiment, the storage device may comprise databases and the memory module 54 comprises instructions and operating identification application for executing the method according to the present invention utilizing the processing unit 52. However, it should be noted that the storage devices may also be omitted and the identification server system 50 may comprise only the memory module 54, which also is configured as maintain the identification database 58. Alternatively, the memory module 54 could be omitted and the identification server system 50 could comprise only one or more storage devices. Therefore, the terms memory module 54 and identification database 58 could be interchangeable in embodiments which they both are not present. The identification database 58 is operable with other components and data of the identification server system 50 by utilizing instructions stored in the memory module 54 and executed by the processing unit 52 over the communications network 100.

The identification database 58 may be provided in connection with the identification server or the identification server may comprise the identification database 58, as shown in FIG. 1. Alternatively, the identification database 58 may be provided as an external database 58, external to the identification server 50, and the identification database 58 may be accessible to and connected to the identification server directly or via the communications network 100.

The storage device(s) may store one or more identification databases 58 for maintaining identification information or object information or reference image information. These different information items may be stored to different database blocks in the identification database 58, or alternatively they may group differently, for example based on each individual object or reference image.

Users may utilize the method and system of the present invention by a user devices 10 as shown in FIG. 1. The user device 10 may be configured to connect with or access the identification server system 50 via the communications network 100. The user device 10 may be a personal computer, desktop computer, laptop or user terminal, as well as a mobile communication device, such as mobile phone or a tablet computer suitable for performing web browsing or capable of accessing and interacting with the identification server system 50. However, the user device 10 may also be personal digital assistant, thin client, electronic notebook or any other such device having a display and interface and being suitable for performing web browsing or capable of accessing and interacting with the identification server system 50.

Further, the user device 10 may refer to any portable or non-portable computing device. Computing devices which may be employed include wireless mobile communication devices operating with or without a subscriber identification module (SIM) in hardware or in software.

Figure 2:
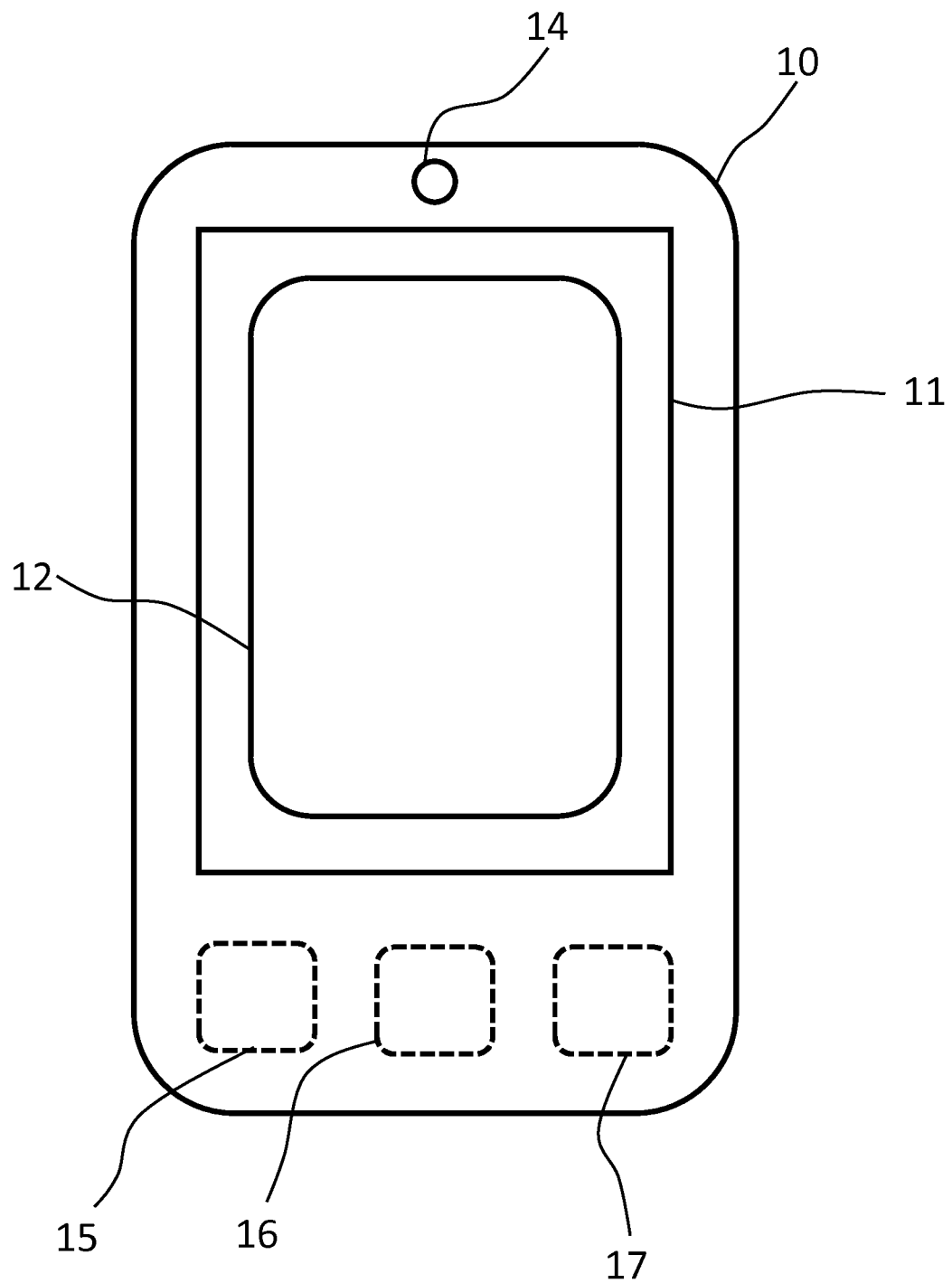
FIG. 2 shows schematically a user device.

As shown in FIG. 2, the user device 10 comprises a user interface 12. The user interface 12 may be any suitable user interface for a human user for utilizing and interacting the identification server system 50 and the identification module 55 for carrying out or interacting with the identification server system 50 and the method of the present invention. The user interface 12 may be a graphical user interface (GUI) provided by a web browser or a dedicated application on a display 11 (e.g., a monitor screen, LCD display, etc.) of the user device 10 in connection with information provided by the identification server system 50 or other systems or servers. The user interface 12 may, for example, enable the users input messages or data, upload and/or download data files and input images and information, provide requests for an identification procedure of an object.

The user interface 12 may be accessible by the user with an input device (not shown) such as touchscreen, keyboard, mouse, touchpad, keypad, trackball or any other suitable hand operated input device or some other kind of input device such as voice operable user device or human gesture, such as hand or eye, gesture detecting input device. The input device may be configured to receive input from the user. The user interfaces (generally API, Application Programmable Interface) may be provided in connection with the system and method of the present invention in order to enable the users to interact with the identification server system 50.

The user interface 12 may also be an interface towards and accessible to an imaging device or camera 14 of the user device 10. Thus, the identification server system 50 may be accessible to the camera 14 of the user device 10 and arranged to receive one or more images obtained with the camera 14 of the user device 10.

The user devices 10 may in some embodiments comprise a user application 17 such as a software application, stored in a user device memory 16, and executed with a user device processor 15.

Furthermore, the system and method of the present invention may be configured to interact with an external service or third party service over the communications network 100 and suitable communication protocol. In the present invention, the external service may be for example an external map service, officials database or the like.

In the present invention authenticity of an object is identified by analysing one or more images of the object to be identified, meaning input images, in relation to a reference image representing original object or all equivalent original objects.

In the context of this application, the one or more input images represent the object the authenticity of which is to be identified. Accordingly, the input images are taken from the object of which authenticity is to be identified with the system and method of the present invention. The input images are image data files providing a digital image of the object.

In one embodiment, the one or more input images are generated or taken with the camera 14 of the user device 10. Further, the input images may be provided with the user application 17 and the identification server system 50 may receive the input images directly from the user device 10 via the communications network. Alternatively, the input images provided with the camera 14 of the user device 10 may be stored to the user device 10, or to the device memory 16 of the user device 10, and sent to the identification server system 50 via the communications network 100 with a separate application, such as messaging application or email application or the like.

In a further alternative embodiment, the input images are generated or taken with a separate imaging device or camera. The input images are further transported to or received in the user device 10 or stored to the user device 10. Then, the input images are sent to the identification server system 50 via the communications network 100 with the user application 17 or with a separate application, such as messaging application or email application or the like.

The imaging device or camera 14 of the user device 10 or the separate imaging device or camera may be any known imaging device or camera such, as digital camera, digital video camera, analogue camera or analogue video camera, or the like. In the case of analogue camera or analogue video camera, the images are digitalised to digital input images.

In the context of this application, the reference image may be any kind of image, video or image file or a data file representing the appearance of the original object. The reference image in the present invention represents original object in relation to which the authenticity of the object is identified or compared. Accordingly, the reference image represents one or more, or all, the original objects.

In some embodiments, the reference image is a digital image of the original object, or a digital video of the original object.

In another embodiment, the reference image is a digital model or a digital model file of the original object, such as 2-dimensional model, 3-dimensional model or the like model of the original object.

In further embodiments, the reference image is manufacturing file of the original object, such as print file or 3-dimensional printing file or the like. The print file may be for example a print file of a packaging.

The reference image and the input images may be in different data format. Thus, the identification server system 50 may be configured to convert the input images to a file format corresponding the reference image. Alternatively, the identification server system 50 may be configured to analyse or compare the reference image and input images, or a target image, to each other in different file formats.

It should be noted that the present invention is not restricted to any file types or image types, but the file and image types may vary and any kind of image and data files may be utilized in the method and system of the present invention.

Figure 3A:
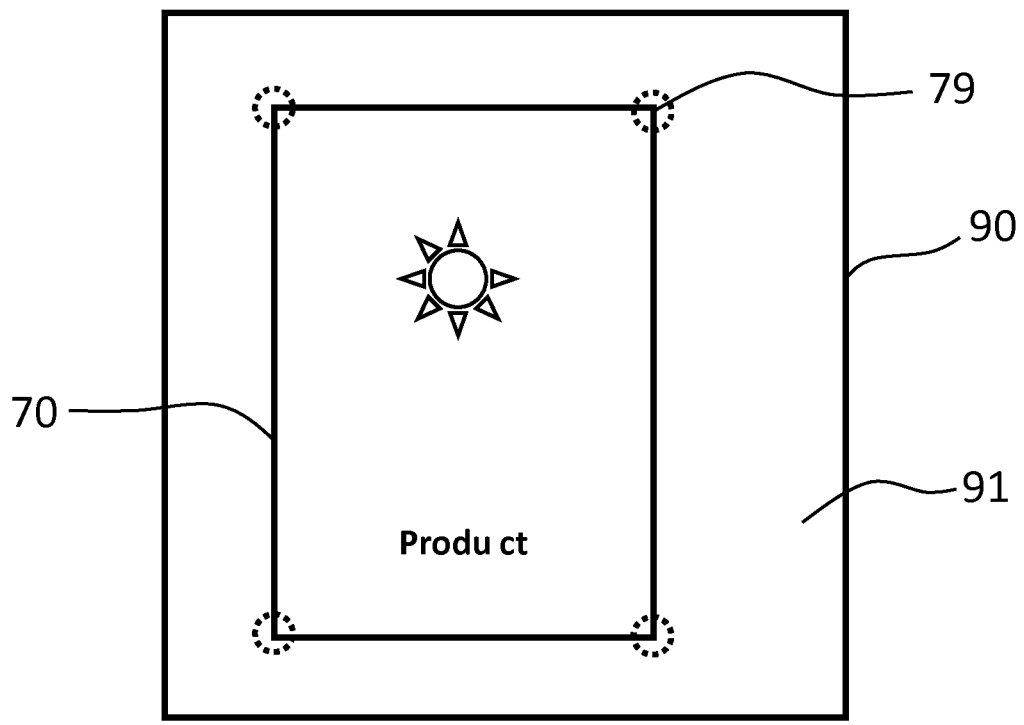
FIGS. 3A and 3B show schematically an input image and a target image, respectively.

FIG. 3A shows one raw input image 90 of an object the authenticity of which is to be identified. The raw input image 90 comprises object input image 70 representing the object and background image or additional image 91 which is not part of the object and object image 70. The object in the input object image 70 is one packaging surface of the packaging.

It should be noted, that the object the authenticity of which is identified may be any object.

Figure 3B:
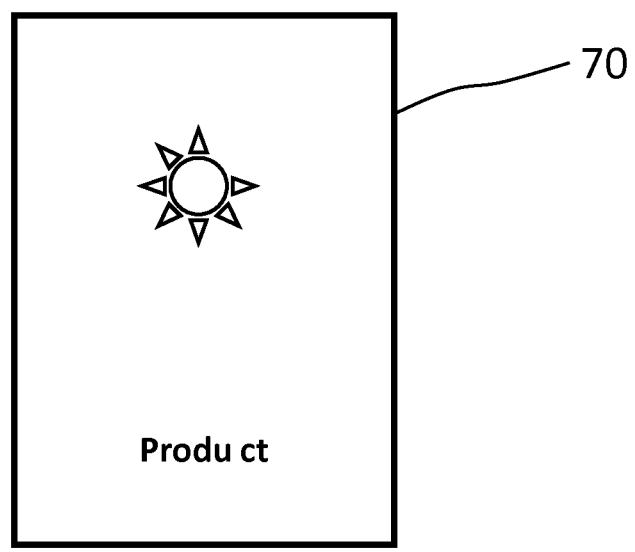

FIG. 3B shows the input object image 70 representing only object the authenticity of which is to be identified. Accordingly, the input object image 70 represents or conforms the contour or appearance of the object.

It should be noted that there may be one or more input images 70 to be utilized similarly together for identifying authenticity of the object.

Thus, in one embodiment, the background image or the additional image 91 of the raw input image 90 is removed.

Alternatively, the input object image 70 is extracted from the input image 90.

Further alternatively, the input object image 70 is only identified in the raw input image 90 and the raw input image 90 is utilized as such, but the identification is carried out only in relation to the identified input object image 70. Thus, only the identified input object image 70 is utilized for the identification but the background 90 the raw input image 90 is not removed or the input object image 70 extracted.

Removing the background 91 and extracting the input object image 70 also comprise identifying the input object image 70 in the raw input image 90. Thus, identifying the input object image 70 in the raw input image 90 is carried out before removing the background 91 or extracting the input object image 70 from the raw input image 90.

Identifying the input object image 70 may comprise identifying corners 79 of the input object image 70 or the object in the raw input image 90. Identifying of the corners 79 may comprise identifying shape of the input object image 70 or the object in the raw input image 90. Identifying the corners 79 and the shape of the input object image 70 or the object in the raw input image 90 may also be different steps and carried out successively. Identifying the shape may be carried out before identifying the corners or vice versa. Identifying the input object image 70 comprises both the identifying the corners and the shape, or only one of them.

Removing the background 91, extracting the input object image 70 and/or identifying the input object image 70 is carried out with the identification server system 50 or the identification application 56, or alternatively by the user device 10 or the user application 17.

The input object image 70 forms a target image 70 or is utilized in generating the target image. The target image 70 is the image of the object which is analysed or compared in relation to the reference image.

In the context of this application the term input image 70 means the input object image 70.

Figure 4A:
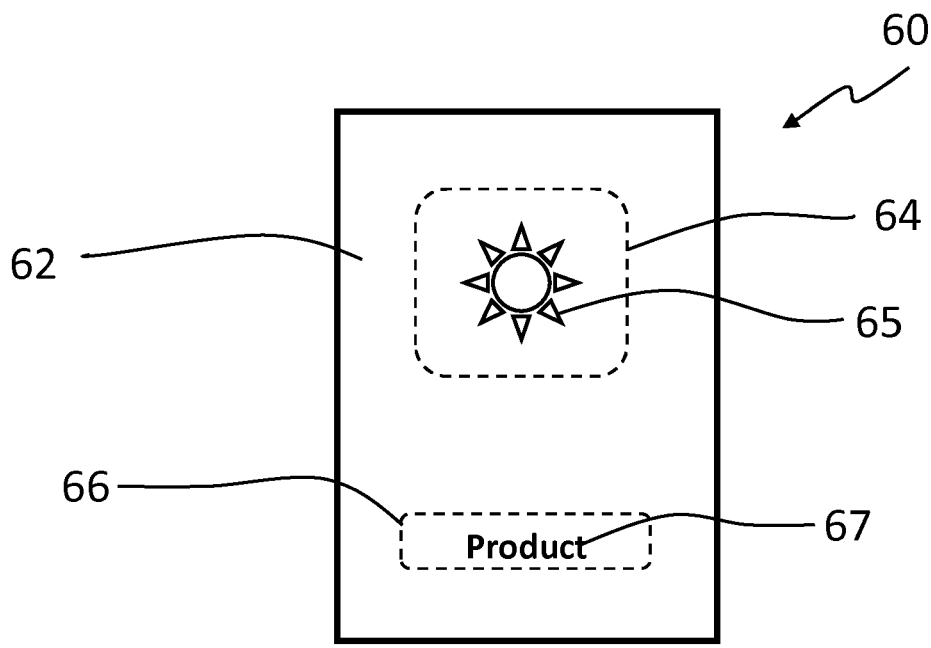
FIGS. 4A and 4B show schematically a reference image of an original object and a target image, respectively.

FIG. 4A shows one reference image 60 of an original object. The reference image 60 of FIG. 4A represents one packaging surface or side of an original packaging. The reference image 60 comprises the reference packaging surface 62 having a reference contour or edges 68 and reference corners 69 forming the shape of the reference image 60 and the original object. The reference packaging surface 62 comprises a reference symbol area 64 provided with a reference symbol 65 representing a sun having multiple rays extending from the centre. The reference packaging surface 62 further comprises a reference text area 66 comprising characters 67 representing word "Product".

It should be noted, that the reference text and symbol areas 64 and 66 of the reference image 60 may vary or depending on the original object. Thus, the reference text area 66 and/or the reference symbol area 64 may be non-existing or there may be two or more reference text areas 66 or reference symbols areas 64.

Figure 4B:
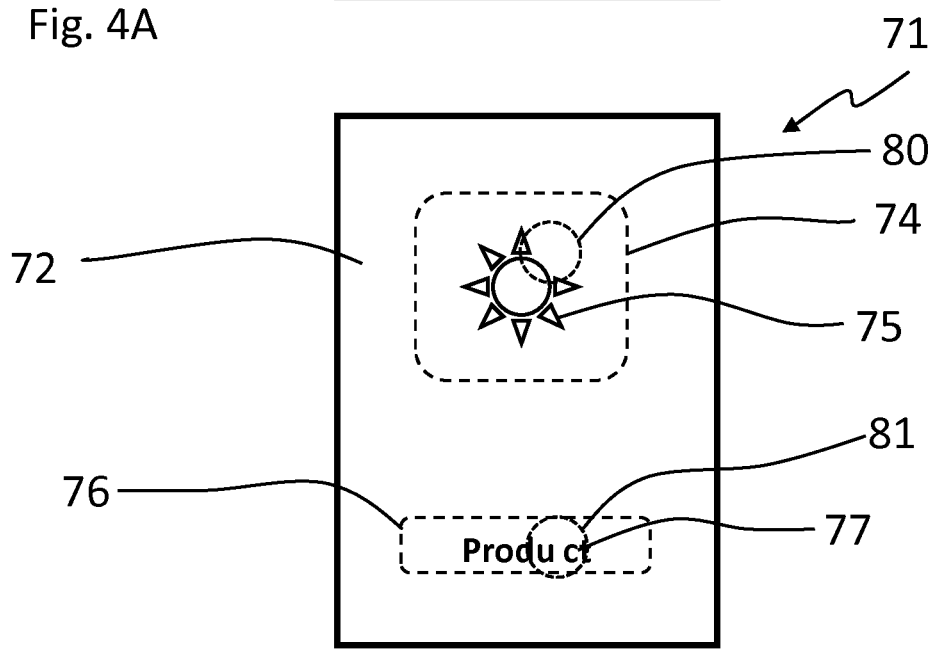

FIG. 4B shows the input image 70 of FIG. 3B and of object of which authenticity is to be identified. The input image 70 of FIG. 4B represents one packaging surface or side of a packaging the authenticity of which is identified in by the method and system of the present invention. The input image 70 comprises the packaging surface 72 having a contour or edges 78 and corners 79 forming the shape of the input image 70 and the object. The packaging surface 72 comprises a symbol area 74 provided with a symbol 75 representing a sun having multiple rays extending from the centre. The packaging surface 72 further comprises a text area 76 comprising characters 77 representing word "Product".

In the present invention, the system and method are configured to analyse the input image 70 in relation to the reference image 60 for identifying authenticity of the object in the input image 70. Accordingly, the input image(s) are compared to the reference image 60. Further, the shapes or contours 68, 78, symbol areas 64, 75, and/or symbols 65, 75, and/or text areas 66, 76 and/or characters 67, 77 of the reference image 60 and the input image(s) 70 are compared to each other. Therefore, the system and method of the present invention evaluate if the input image(s) matches or corresponds the reference image 60, and further if the object matches or corresponds the original object.

As may be seen from FIGS. 4A and 4B, one ray of the symbol 75 in the symbol area 74 of the input image 70 is missing and there is symbol deviation 80 in the input image 70. Further, there is character deviation 81 in the word "Produ ct" in the text area 77 of the input image 70 in relation to the reference image 60.

In the present invention, the one or more input images 60 of the object authenticity of which is to be identified are prepared to correspond as much as possible the reference image. This way it is ensured that variations in obtaining the input images do not affect the identification of authenticity and high-quality identification results may be achieved.

Therefore, at least one of the one or more input images 70 are utilized for generating a target image which is analysed in relation to the reference image. The target image is therefore generated from the at least one or the one or more input images 70.

Figure 5:
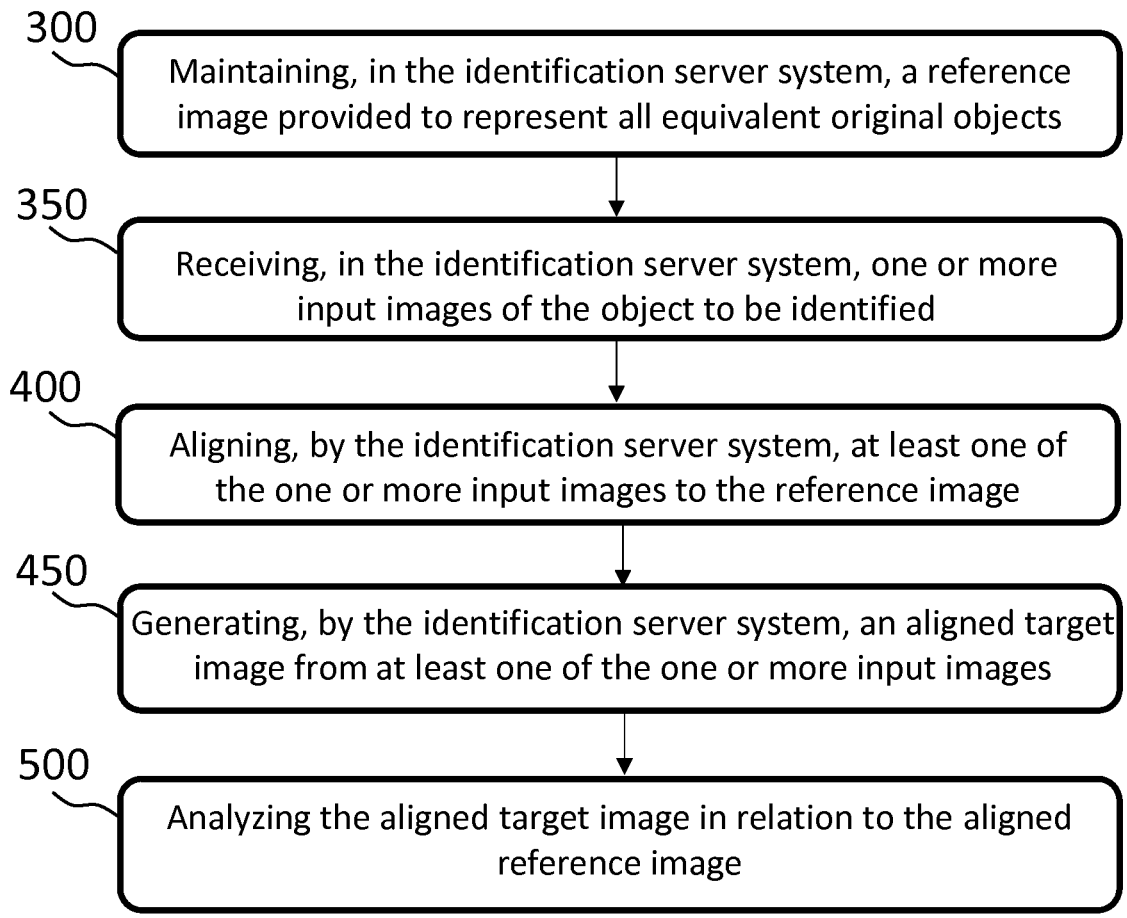
FIGS. 5 and 6 show schematically flow charts of different embodiments according to the method of the present invention.

FIG. 5 shows schematically one embodiment of the method for identifying authenticity of an object according to the present invention.

The method comprises maintaining, in an identification server system 50, a reference image 60 of an original object in step 300. The reference image 60 is provided to represent an original object equivalent with the object the authenticity of which is to be identified. The method comprises receiving in the identification server system 50, one or more input images of the object to be identified in step 350. The input images may be raw input images 90 or input object images 70.

The input images 90, 70 are received from a user device 10.

The method further comprises aligning, by the identification server system 50, at least one of the one or more input images to the reference image by distorting the at least one of the one or more input images in step 400. Aligning by distorting means changing the spacial relationship between parts, locations, areas or pixels of the image such that the relative dimensions inside the image change. Accordingly, image aligning means adjusting dimensions and/or internal dimensions of the input image(s) 70 or the target image to match corresponding dimensions the reference image 60. Further, aligning may be considered to be arranging the target image on the reference image such that same points, locations or contents of the target image and the reference image are correspond of each other. Thus, the target image is distorted to correspond the reference image such that their differences may be accurately analysed.

Accordingly, the goal of aligning and distorting is to compensate at least one of the following: lens distortion caused by the camera, curves and bumps in the object to the identified, perspective, reflections or the like. Thus, the input image is aligned to be the best version and as good as possible for providing a reliable identification.

Accordingly, in step 400 the at least one of the one or more input images 70 is distorted in relation to the reference image 60 such that it corresponds or matches with the reference image 60 for aligning. This way, the details of the at least one of the one or more input images may be analysed accurately in relation to the reference image 60. Thus, at least one aligned input image is generated from the at least one of the one or more input images 70.

After the aligning step 400, the method comprises generating, by the identification server system 50, a target image from the aligned at least one of the one or more input images in step 450. Accordingly, in this step one aligned target image is formed from the at least one of the one or more aligned input images provided in step 400. As the at least one of the one or more input images is aligned to the reference image 60 in step 400, the target image generated in step 450 is also aligned.

The target image may be generated from one or alternatively from two or more aligned input images 70 in step 450.

Generating the target image in step 450 may comprise combining two or more aligned input images 70. Further, generating the target image in step 450 may comprise pre-processing the at least one of the one or more aligned input images 70 by image pre-processing. When only one aligned input image 70 is used for generating the target image, the step 450 may comprise only the image pre-processing.

The generated target image may be further aligned to the reference image before step 500.

Further, the method of FIG. 5 comprises analysing, by the identification server system 50, the aligned target image in relation to the aligned reference image 60 for identifying authenticity of the object. Accordingly, in the step 500 the target image, which is aligned with the reference image 60, is analysed in relation to or compared to the reference image 60 for identifying the authenticity of the object. The authenticity is identifying by analysing whether the target image corresponds or matches with the reference image 60.

Figure 6:
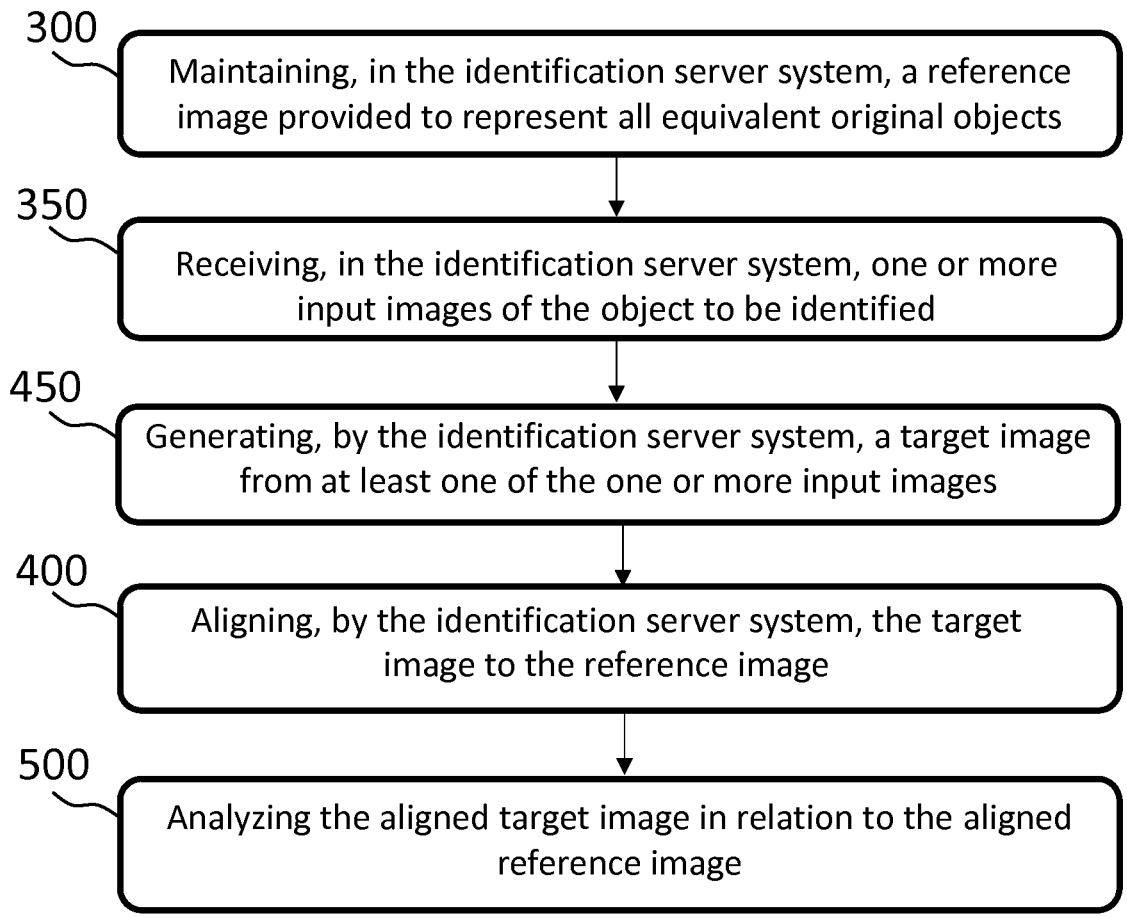

FIG. 6 shows an alternative embodiment of the method according to the present invention. In this embodiment, the steps 300, 350 and 500 correspond the same steps 300, 350 and 500 of the embodiment of FIG. 5.

In the embodiment of FIG. 6, the step 450 of generating, by the identification server system 50, the target image is carried out before the aligning step 400.

In step 450, the target image is generated from the at least one of the one or more input images 70.

When only one aligned input image 70 is used for generating the target image, the step 450 may comprise only the image pre-processing.

When two or more input images are utilized in step 450, generating the target image in step 450 may comprise combining two or more input images 70 for forming the target image. Further, generating the target image in step 450 may comprise pre-processing the at least one of the one or more input images 70 by image pre-processing or pre-processing the combined target image.

Combining the two or more input images 70 for forming the target image in step 450 may further comprise aligning the two or more input images 70 to each other or to the primary input image selected from the input images.

In one embodiment, this is achieved selecting one of the input images as an alignment reference image, meaning the primary input image, and aligning the other input image(s) to the selected alignment reference image by distorting. The alignment in step 450 enables generating good quality target image by combining two or more input images.

Alternatively, combining the two or more input images 70 for forming the target image in step 450 may further comprise aligning the two or more input images 70 to the reference image 60. Then the aligned input images 70 are combined to form the target image. The alignment in step 450 enables generating good quality target image by combining two or more input images. Then, in the step 400, the generated target image is further image aligned by the identification server system 50 or the identification application 56 to the reference image 60.

In one embodiment, the method comprises receiving, in the identification server system 50, two or more input images of the object to be identified in step 350 and aligning at least two of the two or more received input images in relation to each other or to the reference image.

The step 450 of generating the target image from the two or more aligned input images comprises dividing, by the identification server system 50, at least two of the two or more input images into two or more sub-parts, selecting, by the identification server system 50, at least two of the two or more sub-parts, and generating, by the identification server system 50, the target image by combining the selected sub-parts as the target image.

Preferably, each other two or more input images is divided to the two or more sub-parts in similar manner such that there are two or more corresponding sub-parts for each sub-part. Thus, one of the corresponding sub-parts is selected to the target image for each of the sub-parts. The target image is formed from the selected sub-parts. This enables forming best possible target image.

In another embodiment, the step 450 of generating the target image from the two or more aligned input images comprises dividing, by the identification server system 50, at least two of the two or more input images into two or more sub-parts, comparing, by the identification server system 50, the two or more sub-parts of the input images to corresponding sub-parts of the reference image, selecting, by the identification server system 50, at least two of the two or more sub-parts based on the comparison, and generating, by the identification server system 50, the target image by combining the selected sub-parts as the target image. Accordingly, there are two or more corresponding alternative sub-parts for each sub-part of the target image. These corresponding alternative sub-parts are compared to the corresponding sub-part of the reference image and one of the two or more alternative sub-parts is selected to the target image based on the comparing. This is repeated for all of the corresponding alternative sub-parts of the two or more input images. The target image is formed from the selected sub-parts. This enables forming best possible target image.

When only one input image 70 is received in step 350, the input image 70 forms the target image for the steps 400 and 450 in the embodiment of FIGS. 5 and 6.

Accordingly, when only one input image is received the step 400 may be carried out before step 450, or alternatively step 450 may be carried out before step 400.

When two or more input images 70 are received in step 350, one input image may be selected as the target image by the identification server system 50 for the steps 400 and 450 in the embodiment of FIGS. 5 and 6. The selecting may be carried out by the identification server system 50 in step 350, or in step 400 or in step 450. Further, the selecting may comprise first comparing the two or more input images 70 to the reference image 60 and selecting one of the input images 70 as the target image based on the comparison. The selection by the identification server system 50 may be carried out such that the one of the two or more input images 70 is selected providing best match with the reference image 60.

Also in this embodiment, the step 400 may be carried out before step 450, or alternatively step 450 may be carried out before step 400.

It should be noted, that in all embodiments, the step 450 may also be carried out by the user device 10 or the user application 17 before step 350 in the embodiment of FIG. 6. Thus, in step 350 the generated target image is received in the identification server system 50.

The target image, combined from the two or more input images, may be further aligned with the reference image in step 400. Alternatively, the two or more input images are aligned to the reference image before combining them to for the target image and no further alignment is needed. However, the combined target image may also be aligned also in the latter case.

Figure 7A:
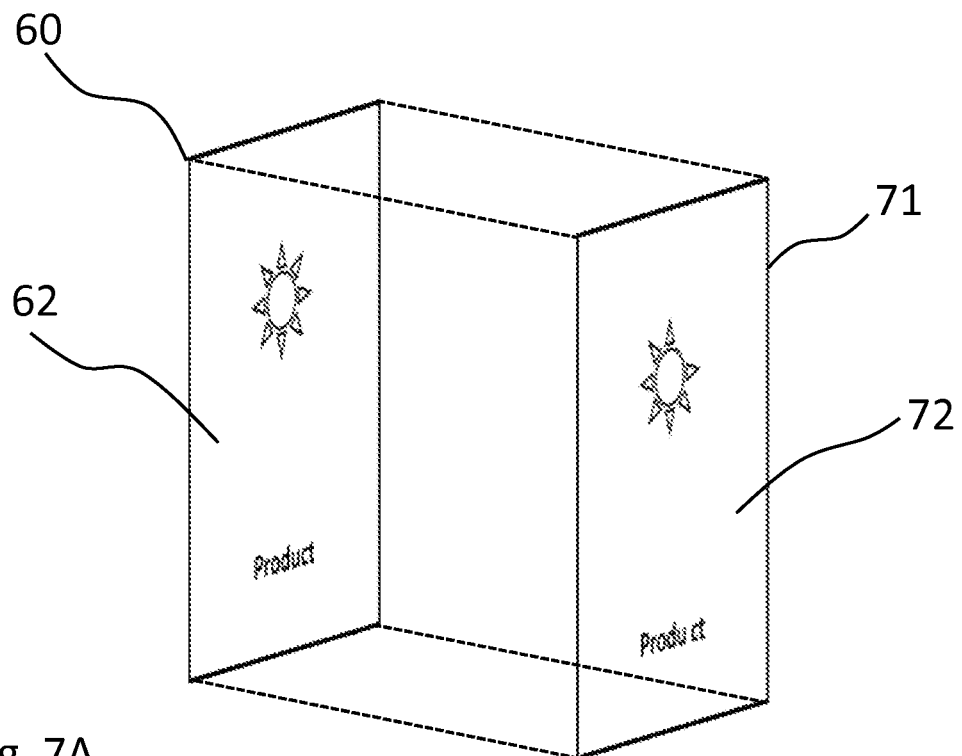
FIGS. 7A, 7B and 7C shows schematically image aligning the reference image and the target image of FIGS. 4A and 4B.
Figure 7B:
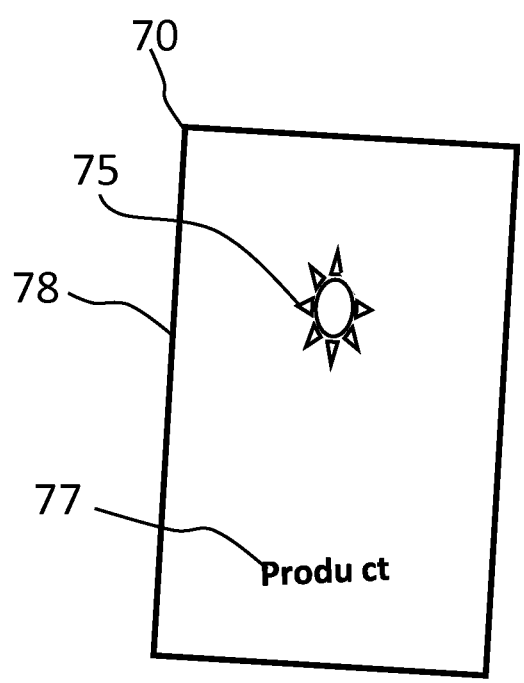
Figure 7C:
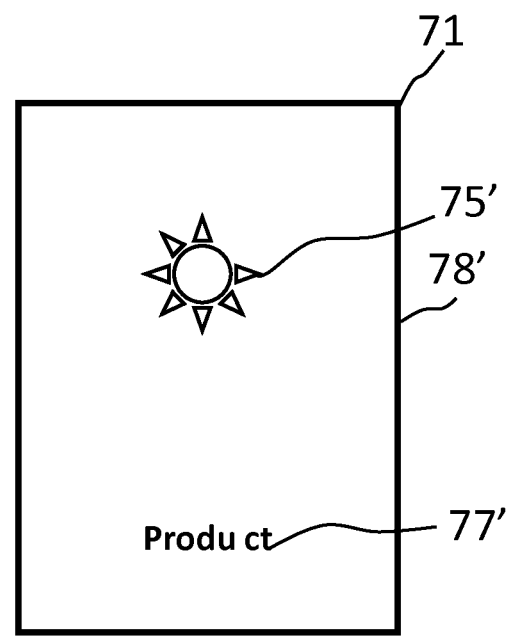

FIGS. 7A, 7B and 7C shows schematically the step 400 of aligning the target image 71 to the reference image 60. The one or more input images 70 may be aligned in the same manner to the reference image 60 or to each other.

As shown in FIG. 7A, the target image is image aligned to the reference image 60 such that corresponding locations or points are aligned to each other for forming an aligned target image 71. The image alignment means in the present application that the target image is deformed and distorted to match reference image 60. When the target image 70 and the reference image 60 are aligned, the comparison of the images may be carried out in efficient and accurate manner as same features in the aligned target image 71 and the reference image 60 are compared to analysed against each other.

The input images 70 often comprise deviations in relation to the original object and the reference image 60 due to circumstances during providing the input images 70 or due to variables in imaging or taking the images and the imaging devices. These variables cause deviations to the input images making the identification of authenticity difficult or less reliable.

FIG. 7B shows one input image 70 or input object image representing the object to be identified for authenticity. The input image 70 is taken from the object with the camera and comprises the outer edges or contour 78, symbol 75 and text 77. As may be seen from FIG. 7B, the input image 70 or the outer edges 78, symbol 75 and/or the text is little distorted or does not match the appearance of the original object identically due to variables in circumstances taking the image and the imaging device itself. During the alignment step 400 the input image 70 or the target image generated from the one or more input images is aligned to the reference image 60 for forming the aligned target image 71. During the alignment step the input image 70 or the target image is distorted such that similar locations or points or contents match the corresponding locations or points or contents of the reference image.

Accordingly, the goal of aligning and distorting is to compensate at least one of the following: lens distortion caused by the camera, curves and bumps in the object to the identified, perspective, reflections or the like. Thus, the input image is aligned to be the best version and as good as possible for providing a reliable identification.

Distorting the input image or the target may comprise at least scaling, keystone correcting the input image 70 or the target in relation to the reference image for generating the aligned target image. The distorting may be carried out for the image as a whole or locally to one or more sub-parts, points, locations or pixels of the input image 70 or the target image.

Keystone correction means distortion of an image caused by projecting it onto an angled surface, or vice versa projecting an image taken from an angle to a surface on a straight surface.

Image aligning may in some embodiment further comprise rotating and/or shifting the input image 70 or the target image in relation to the reference image 60.

FIG. 7C shows the aligned target image 77. As may be seen, the aligned target image 71, together with the aligned contour or outer edges 78', aligned symbol 75', aligned text 77', is aligned to match the reference image 60. The aligned target image 71 is thus provided to correspond the reference image 60 as much as possible before analysing the authenticity in step 500.

Figure 8:
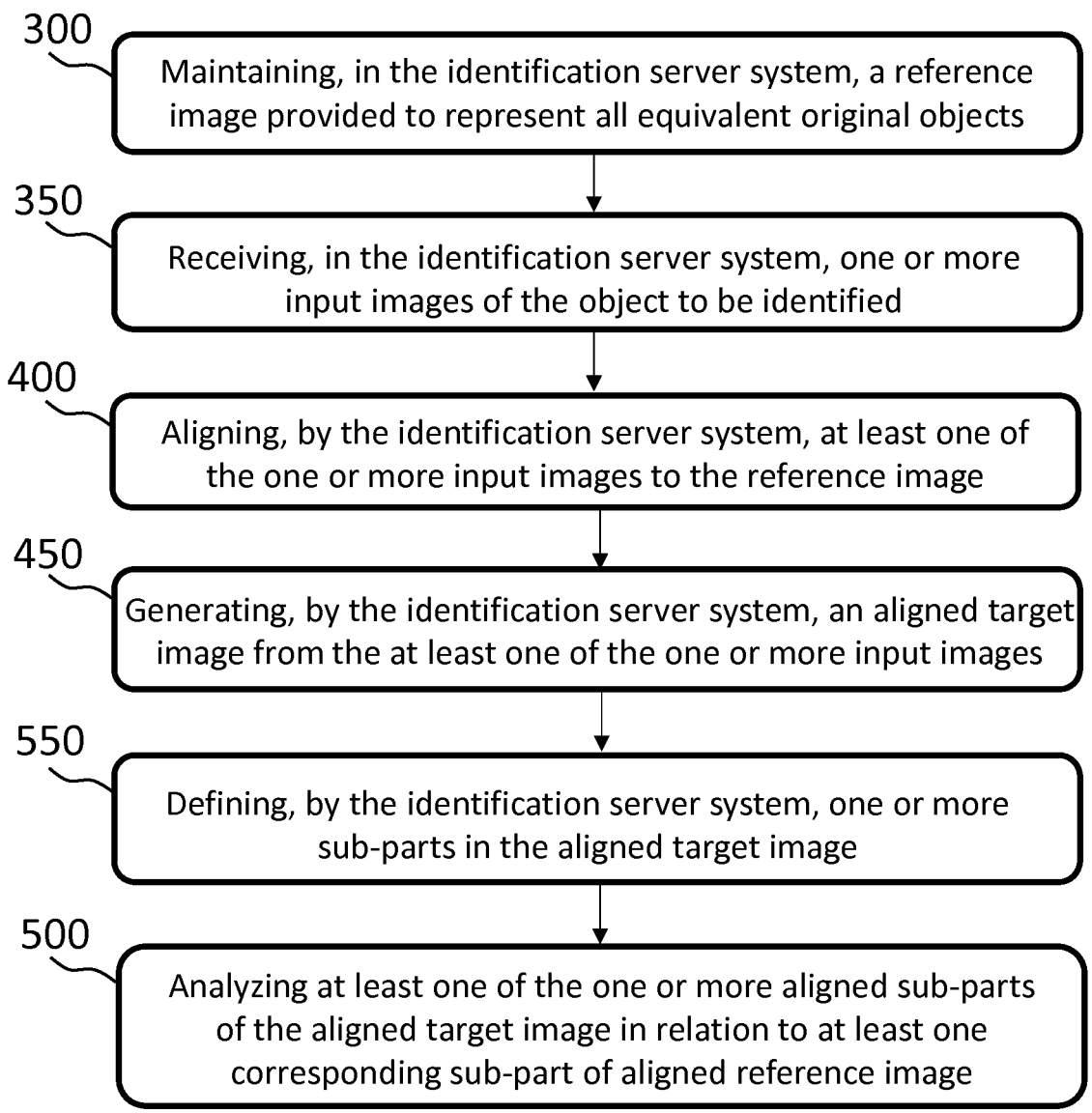
FIGS. 8, 9, 10, 11 and 12 show schematically flow charts of different embodiments according to the method of the present invention.

FIG. 8 shows a flow chart of one embodiment of a method according to the present invention. The steps 300, 350, 400 and 450 may be carried out as described above in relation to FIGS. 3 to 7C. However, in this embodiment, the one or more input images 70 are aligned to the reference image 60 in step 400 and then an aligned target image 71 is generated in step 450. The step 450 may be carried out as disclosed above.

The embodiment of FIG. 8 further comprises a step 550 carried out before step 500. The step 550 comprises defining, by the identification server system, one or more sub-parts in the aligned target image 71. Then, the step 500 comprises analysing, by the identification server system 50, at least one of the one or more sub-parts of the aligned target image 71 in relation to at least one corresponding sub-part of the aligned reference image 60 for identifying authenticity of the object.

In this embodiment, the step 450 may further comprise aligning the generated target image to the reference image 60 for forming the aligned reference image.

Alternatively, the step 550 or the step 500 may comprise aligning the at least one of the one or more sub-parts of the target image to the corresponding sub-part of the reference image 60 before carrying out the analysing.

Accordingly, in this embodiment each sub-part of the aligned target image 71 may be analysed separately in relation the corresponding sub-part of the reference image 60. Thus, the whole aligned target image does not need to be analysed.

The reference image 60 may be pre-divided to two or more sub-parts and the aligned target image 71 is divided similarly to the corresponding sub-parts based on the sub-parts of the pre-divided reference image 60.

Alternatively, the aligned target image 71 may be divided to two or more sub-parts. Then, the reference image 60 is divided similarly to two or more sub-parts based on the divided aligned target image 71.

Further alternatively, an attention algorithm may be used to analyse the aligned target image and define one or more sub-parts in the aligned target image 71 to be analysed against the corresponding one or more sub-parts of the reference image 60. Yet alternatively, the attention algorithm may be used to analyse the reference image and define one or more sub-parts in the reference image 60 to be analysed against the corresponding one or more sub-parts of the aligned target image 71.

The input images may be aligned in similar manner to the primary input image or to the reference image for generating the target image.

Figure 9:
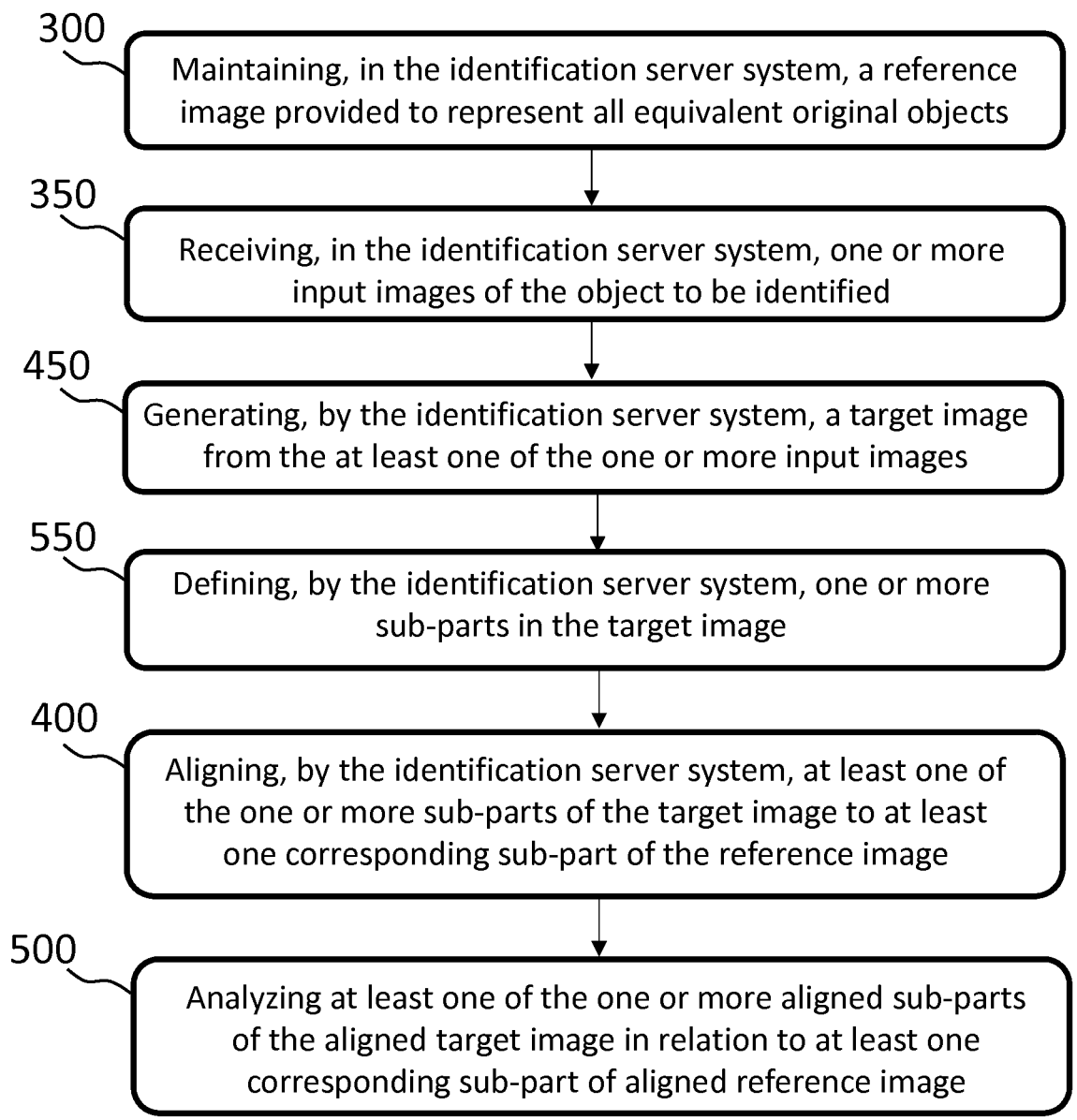

FIG. 9 shows a flow chart of another embodiment of a method according to the present invention. The steps 300, 350 and 450 may be carried out as described above in relation to FIGS. 3 to 7C. However, in this embodiment, the target image is generated from the one or more input images 70 in step 450 before aligning the target image 70 to the reference image 60.

Accordingly, in the step 450 of generating the target image from the at least one of the one or more input images may in some embodiments comprises combining two or more input images for forming the target image. Further, this may comprise aligning the two or more input image to each other or to one of the input images or to the reference image before combining. In an alternative embodiment, one of the one or more input images is selected as the target image, as disclosed above.

Then the method comprises defining one or more sub-parts in the target image in step 550. The defining of the sub-parts in the target image may be carried out in any of the manners as disclosed above.

After defining the one or more sub-parts in the target image, at least one of the one or more sub-parts of the target image is aligned to at least one corresponding sub-parts the reference image 60 in step 400.

Accordingly, one or more sub-parts of the target image may be aligned independently and separately to the corresponding sub-parts of the reference image 60. Further, not all of the sub-parts of the target image need to be aligned and analysed.

The at least one aligned sub-part of the one or more sub-parts of the target image is further analysed in relation to the corresponding sub-part of the reference image 60 in step 500.

Aligning of the target image to the reference image or the at least one sub-parts of the target image to the corresponding sub-parts of the reference image may be carried out different manners. The same applies for aligning one or more input images to each other or to one of the input images or to the reference image, or the sub-parts thereof.

Figure 11:
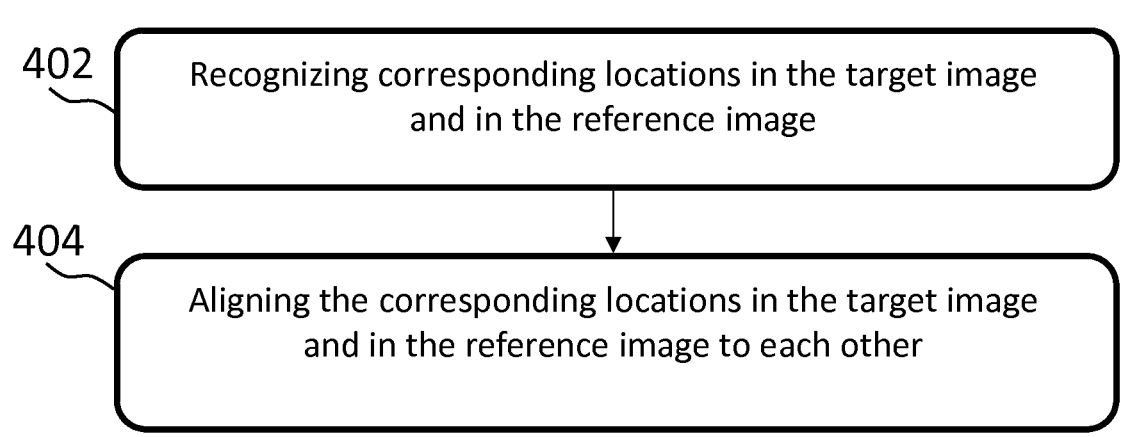

In one embodiment, the aligning, for example in step 400, comprises recognizing corresponding locations in the target image and in the reference image in step 402. Then the corresponding locations in the target image and in the reference image are aligned in step 404 for aligning the target image to the reference image, as shown in flow chart of FIG. 11.

In one embodiment, recognizing the corresponding locations in the target image and in the reference image in step 402 and the aligning of the target image and the reference image in step 404 are carried out by an aligning algorithm in the identification server system 50. The aligning algorithm may be for example a machine learning aligning algorithm, such as an aligning neural network, trained to recognize the corresponding locations and to align the target image and the reference image, or the corresponding sub-parts thereof.

In an alternative embodiment, the step 402 of recognizing corresponding locations in the target image and in the reference image may comprise recognizing corresponding points or contents of the reference image and the reference image. This may be carried out an image recognition algorithm, machine learning recognition algorithm or the like in the identification server system 50. Then, in the step 404 the recognized corresponding locations, points or contents of the target image and the reference image are aligned by distorting the target image. The step 404 may be carried out by an aligning algorithm, such as machine learning aligning algorithm or aligning neural network, trained to align the target image and the reference image, or the corresponding sub-parts thereof, based in the recognized corresponding locations, points or contents.

In some embodiments, the step 402 is carried out such that first one or more locations, points or contents are recognized in the reference image. The mentioned one or more locations of the reference image may also be pre-recognized, or the aligning algorithm or recognizing algorithm trained with the reference image having the mentioned locations, points or contents may be used. Then, the step 402 comprises recognizing the locations, points or contents in the target image corresponding mentioned locations, points or contents of the reference image.

In an alternative embodiment, the step 402 is carried out such that first one or more locations, points or contents are recognized in the target image. The mentioned one or more locations of the target image may be recognized with the aligning algorithm or recognizing algorithm trained to recognize locations, points or contents in the target image. Then, the step 402 comprises recognizing the locations, points or contents in the reference image corresponding mentioned locations, points or contents of the target image.

Then, the step 404 is carried out such that the recognized corresponding locations, points or contents of the target image and the reference image are aligned as discussed above.

FIGS. 12 to 17 show one embodiment aligning the target image to the reference and carrying out the step 400. It should be noted, that the method disclosed in connection with the FIGS. 12 of 17 may also be utilized for aligning the input images to each other or to the reference image.

Figure 12:
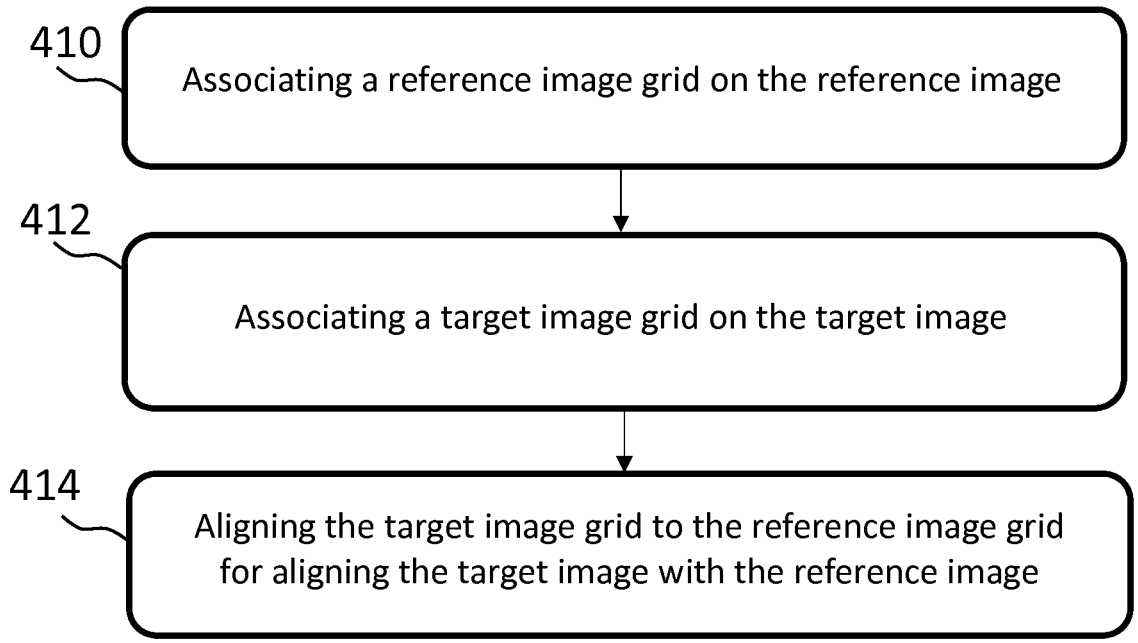

FIG. 12 shows schematically a flow chart of aligning the target image to the reference image. It should be noted that this aligning method may also be used for aligning input images to each other or to the reference image.

Figure 13A:
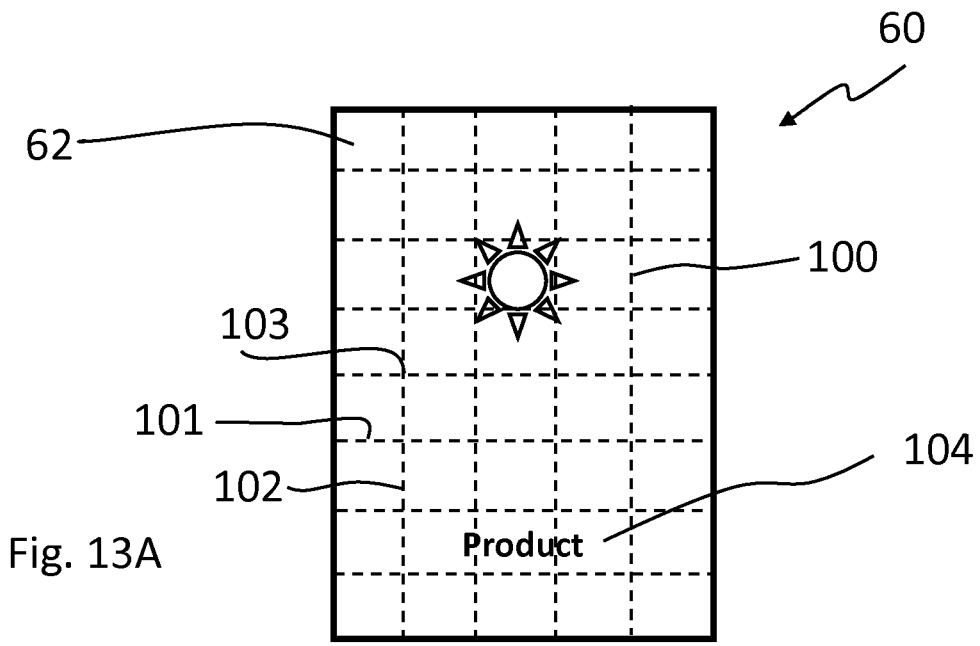
FIGS. 13A and 13B show schematically the reference image and the target image with grids, respectively.

The aligning comprises associating or arranging a reference image grid 100 to the reference image 60 in step 410. The reference image 60 with the reference image grid 100 is shown in FIG. 13A. The reference image grid 100 is locked or secured to the reference image 60 such that the reference image grid 100 is immovable or cannot be moved in relation to the reference image 60.

In the embodiment of FIG. 13A, the reference grid 100 is associated on the reference image 60 disclosing the reference packing surface 62. The reference image grid comprises first grid lines 101 extending in a first directions and second grid lines 102 extending in a second direction. In this embodiment, the first and second grid lines 101, 102, and thus the first direction and second direction, extend perpendicularly to each other. However, in other embodiments they may also extend alternative transverse directions or in an angle relative to each other. The reference image grid 100 comprises two or more first grid lines 101 and two or more second grid lines 102 for forming the reference image grid 100.

The first grid lines 101 and the second grid lines 102 of the reference image grid 100 intersect in intersections points or grid points 103. Further, the first grid lines 101 and the second grid lines 102 of the reference image grid 100 provide two or more grid areas 104. Thus, each grid area 104 is defined by two adjacent first grid lines 101 and two adjacent second grid lines 102 and the grid points 103 between these first and second grid lines 101, 102.

It should be noted that according to the present invention the reference image grid 100 may comprise any number of the first and second grid lines 101, 102 depending on the embodiment and depending on the reference image 60.

Further, in some embodiments the reference image grid 100 is pre-defined with pre-determined number of the first and second grid lines 101, 102 and thus a predetermined number of reference grid points 103 and reference grid areas 104.

Alternatively, the reference image grid 100 and the number of the first and second grid lines 101, 102 and the number of reference grid points 103 and reference grid areas 104 is determined in step 410 in associating the reference image grid 100 on the reference image 60. In this embodiment, the reference image grid 100 may be determined based on the target image or based on the reference image or based on the reference image and the target image.

Figure 13B:
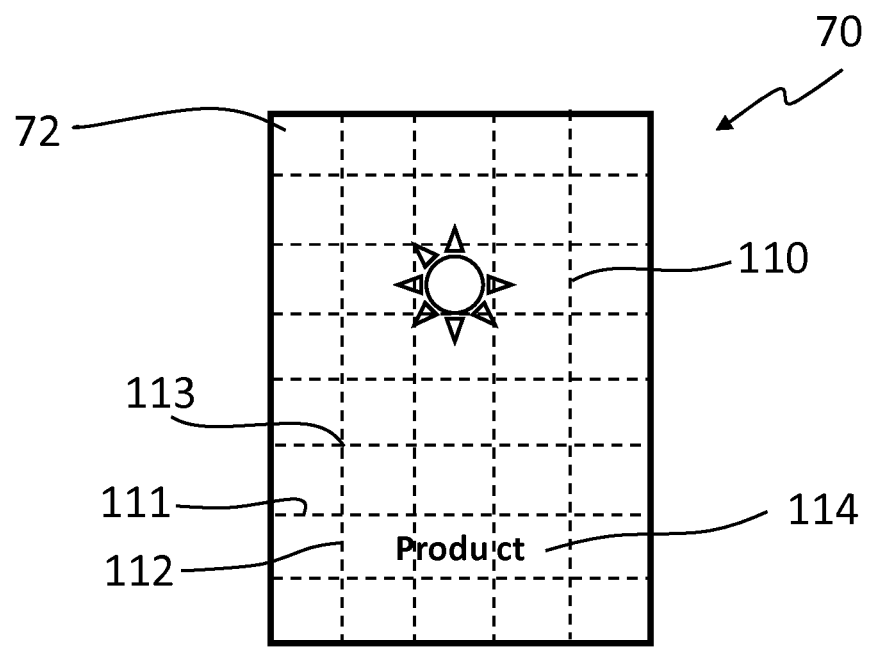

As shown in FIG. 12, the aligning comprises associating or arranging a target image grid 110 to the target image 70 in step 412. The target image 70 with the target image grid 110 is shown in FIG. 13B. The target image grid 110 is locked or secured to the target image 70 such that the target image grid 110 is immovable or cannot be moved in relation to the target image 70.

In the embodiment of FIG. 13B, the target grid 110 is associated on the target image 70 disclosing the target packing surface 72. The target image grid 110 comprises first grid lines 111 extending in a first directions and second grid lines 112 extending in a second direction. In this embodiment, the first and second grid lines 111, 112, and thus the first direction and second direction, extend perpendicularly to each other. However, in other embodiments they may also extend alternative transverse directions or in an angle relative to each other. The target image grid 110 comprises two or more first grid lines 111 and two or more second grid lines 112 for forming the target image grid 110.

The first grid lines 111 and the second grid lines 112 of the target image grid 110 intersect in intersections points or grid points 113. Further, the first grid lines 111 and the second grid lines 112 of the target image grid 110 provide two or more grid areas 114. Thus, each grid area 114 is defined by two adjacent first grid lines 111 and two adjacent second grid lines 112 and the grid points 113 between these first and second grid lines 111, 112.

It should be noted that according to the present invention the target image grid 110 may comprise any number of the first and second grid lines 111, 112 depending on the embodiment and depending on the target image 70.

Further, in some embodiments the reference image grid 100 is pre-defined with pre-determined number of the first and second grid lines 101, 102 and thus a predetermined number of reference grid points 103 and reference grid areas 104. Then, the target image grid 110 is provided to correspond or similar or identical with the reference image grid 100.

Alternatively, the target image grid 110 and the number of the first and second grid lines 111, 112 and the number of target grid points 113 and target grid areas 114 is determined in step 412 in associating the target image grid 110 on the target image 70. In this embodiment, the target image grid 110 may be determined based on the target image or based on the reference image or based on the reference image and the target image. Further, in this embodiment the step 412 may be carried out before step 410 and the target image grid 110 determined and associated before the reference image grid 100.

The aligning then comprises step 414 in which the target image grid 110 and the reference image grid 100 are utilized for aligning the target image 70 to the reference image 60 and providing the aligned target image 71.

The input images usually have distortions relative to the reference image due to the taking the image for example due to the angle in which the images are taken, and due to distortions caused by the imaging device. Then, as the target image grid 110 is associated on the target image 70 the target grid points 113 in relation to the target image 70 are not identically with the reference grid points 103 in the reference image 60 in relation to the reference image 60.

The reference image grid 110 and the target image grid 110 comprise corresponding reference grid points 103 and target grid points 113, and the aligning step 414 comprises aligning, by the identification server system 50, the target image 70 to the reference image 60 by moving at least one of the target grid points 113 of the target image grid 110 such that the target image 70 is distorted. Accordingly, the target grid points 113 are moved relative to each other or the at least one target grid point 113 is moved relative to other target grid points 113 of the target image grid 110 such that the target image is distorted. Accordingly, each of the target grid points 113 or the at least one of the target grid points 113 is separately aligned in relation to corresponding one of the reference grid points 103 of the reference image grid 100 for aligning the target image 70 to the reference image 60.

Therefore, the target grid points 113 are moved relative to the reference grid points 103 of the reference image grid 100 such that the target image is distorted in relation to the reference image 60.

According to the above mentioned, as each target grid point 113 is separately aligned in relation to the corresponding reference grid point 103 the target image 70 and the target image grid 110 becomes distorted. Thus, the aligned target image 71 is distorted relative to the target image 70 which was generated before the alignment. Further, the target image grid 110 and the target grid areas 114 become distorted relative to the target image grid 110 and the target grid areas 114 provided before the alignment. Therefore, the distorting provides the aligned target image 71 which is aligned to the reference image 60 and the distortion of the target image 70 relative to the reference image 60 is eliminated, or substantially eliminated.

Figure 19:
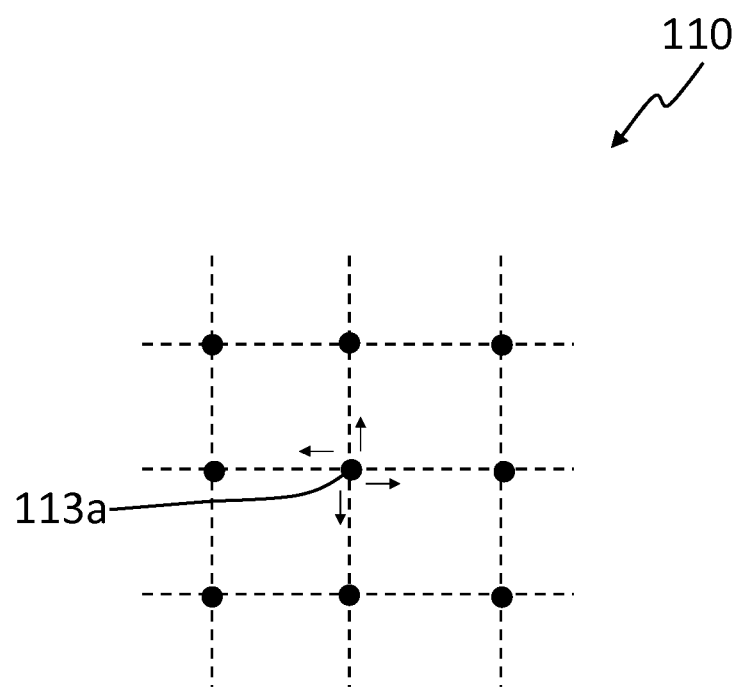
FIG. 19 shows schematically moving of the target grid points.

FIG. 19 shows schematically moving of one target grid point 103*a* relative to other target grid points 113 and reference image grid 100.

Figure 20A:
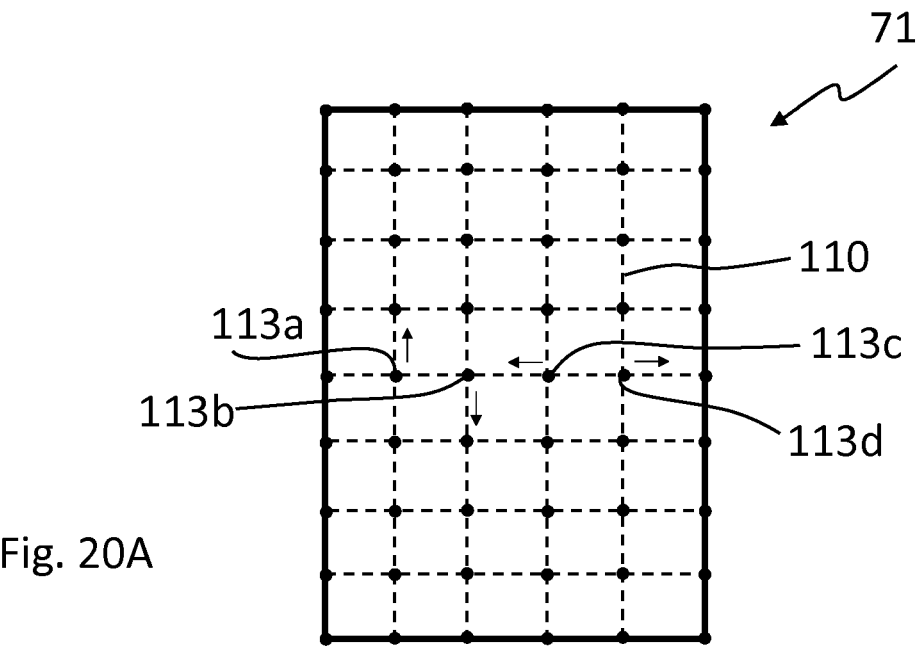
FIGS. 20A and 20B show schematically distorting the target image grid by moving target grid points.
Figure 20B:
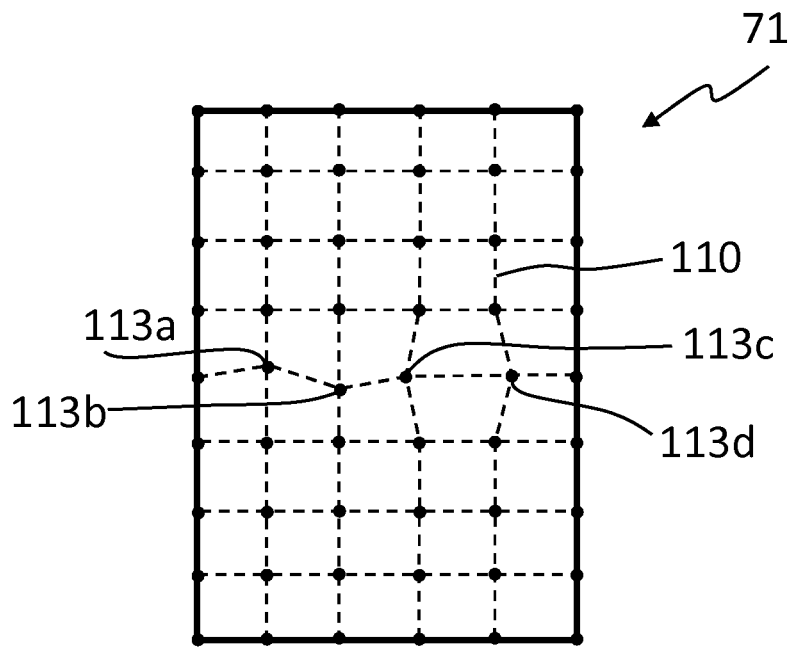

FIGS. 20A and 20B further show moving a several target grid points 113*a*, 113*b*, 113*c*, 113*d* relative to each other, and other target grid points, for distorting the target image grid 110, the target image 70 for aligning the target image to the reference image.

Figure 14:
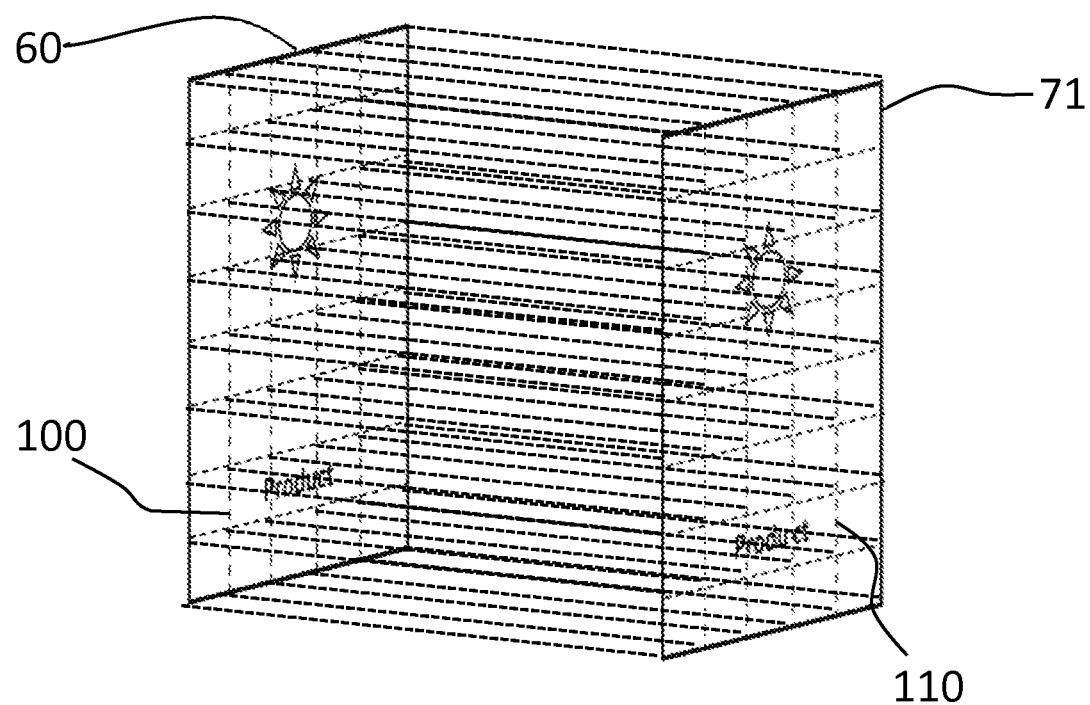
FIG. 14 shows schematically image aligning the reference image and the target image of FIGS. 13A and 13B by utilizing the grids.

FIG. 14 shows a schematic view of the aligned target image grid 110 and the reference image grid 100 and the aligned target image 71 and the reference image 60.

In some embodiment, the step 414 of aligning the target image 70 to the reference image 60 is carried out iteratively.

In one embodiment, the step 414 comprises iteratively aligning, by the identification server system 50, the target image 70 to the reference image by iteratively moving the target grid points 113 of the target image grid 110 for distorting the target image 70. Accordingly, the target grid points 113 or the at least one of the target grid points 113 is moved two or more times during the aligning in step 414. This may be carried out such that in a first moving cycle the target grid point(s) 113 are moved first time relative to each other with first pre-determined movements or moving distances. Then, in next and further possible successive moving cycles the target grid point(s) 113 are moved successively relative to each other and aligned to the corresponding reference grid points 103 with successive pre-determined movements or moving distances, the successive pre-determined movements or moving distances being smaller than the first pre-determined movements or moving distances and arranged to become successively smaller. Thus, iterative and accurate alignment is achieved. The analysing step 500 may be carried out between successive moving cycles.

In one embodiment, the iterative aligning in step 414 further comprises aligning, by the identification server system 50, the target image to the reference image by moving the target grid points 113 of the target image grid 110 for distorting the target image 70. Between the successive moving cycles the aligning comprises verifying, by the identification server system 50, aligning of the target image to the reference image, and iteratively aligning, by the identification server system 50, the target image to the reference image by iteratively moving the target grid points 113 of the target image grid 110 in the successive moving cycles for distorting the target image 70.

Figure 21:
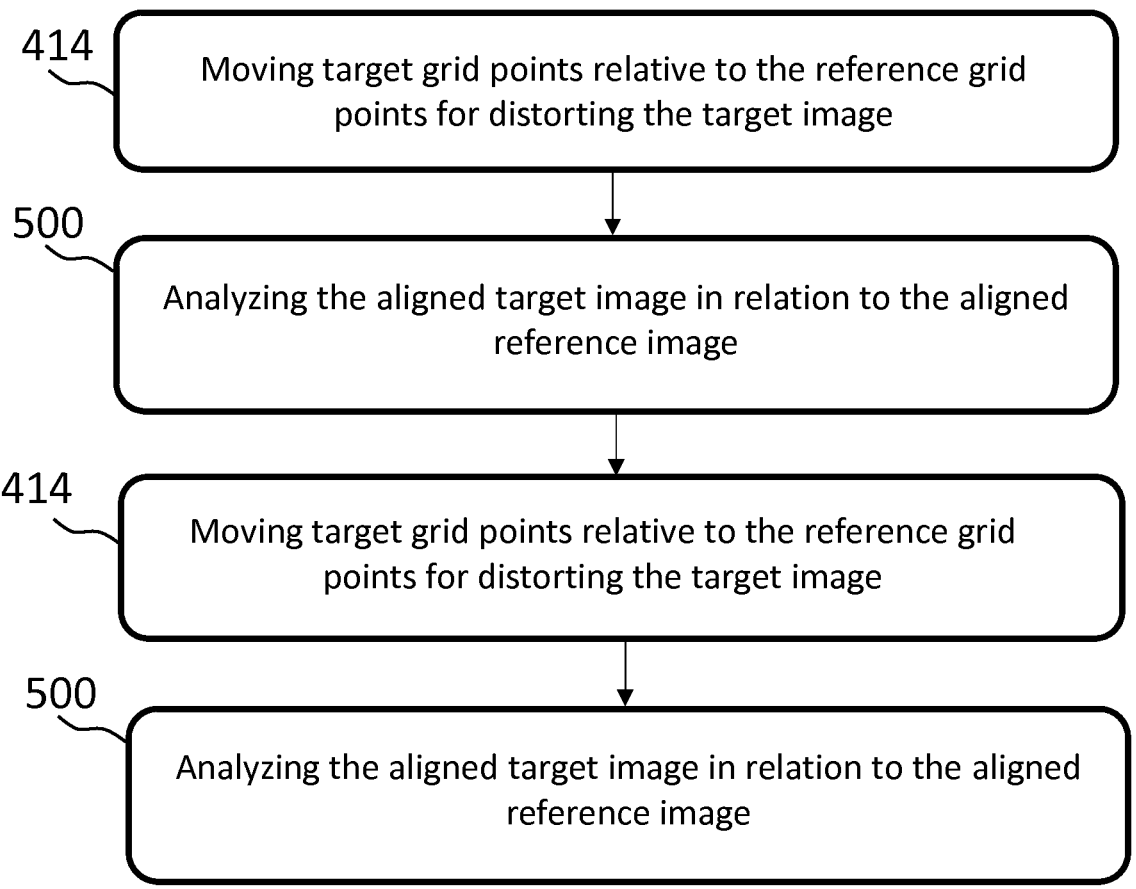
FIG. 21 shows schematically flow chart of one embodiment according to the method of the present invention.

In some embodiment, the verification is carried by the step 500 analysing, as shown in FIG. 21.

Figure 15:
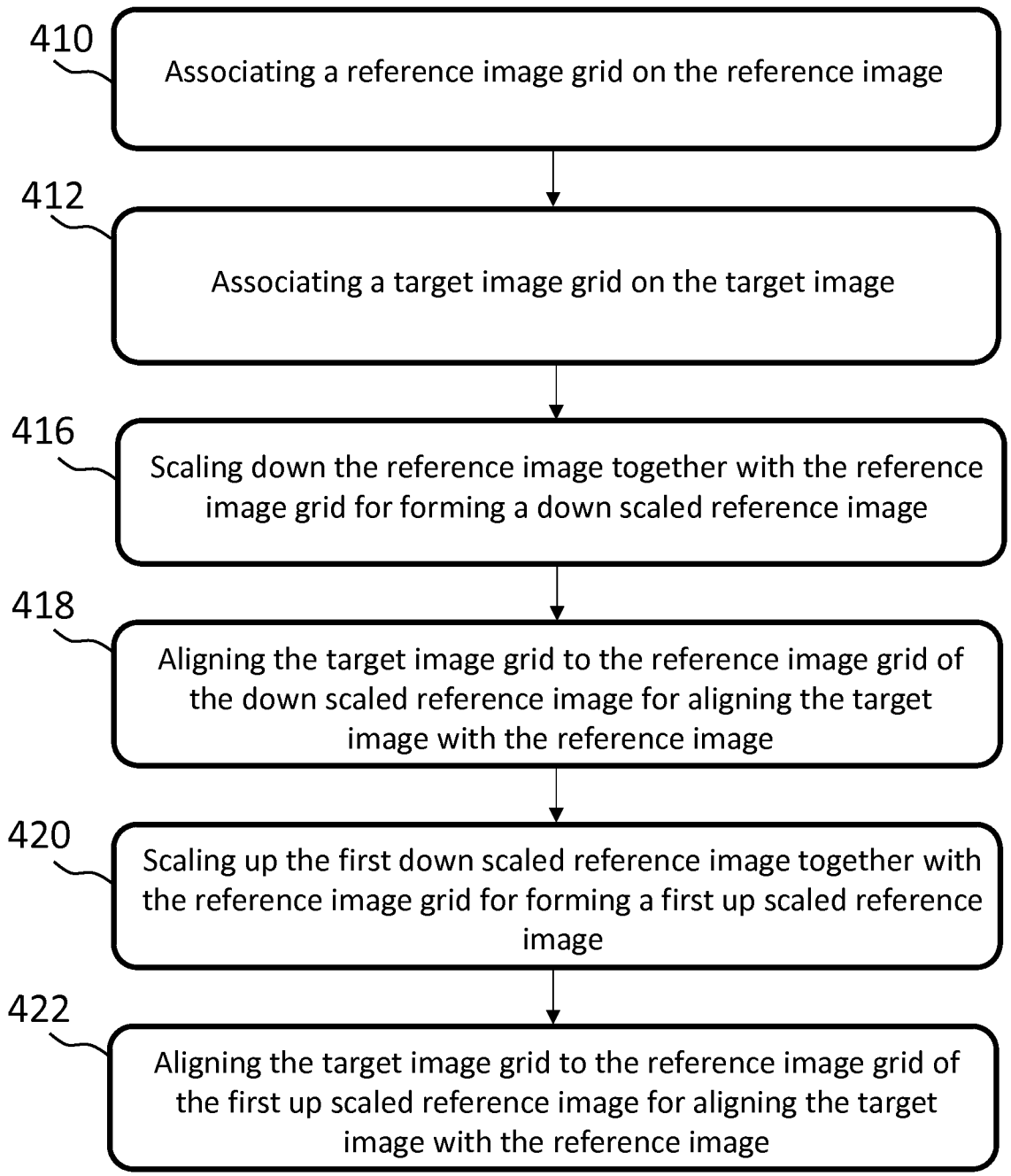
FIG. 15 shows schematically flow chart of one embodiment according to the method of the present invention.

FIG. 15 shows schematically a flow chart of an embodiment in which the aligning of the target image grid 110 to the reference image grid 100 iteratively is carried in more detail.

In this embodiment, the aligning comprises step 410 of associating the target image grid 110 to the target image 70 and step 412 of associating the reference image grid 100 to the reference image 60.

In this embodiment, the reference image 60 and the reference image grid 100 are scaled down in step 416 for forming a down scaled reference image 60 having the associated and down scaled reference image grid 100.

Figure 16A:
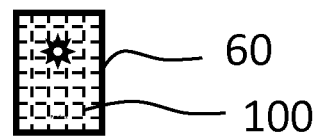
FIGS. 16A, 16B, 16C and 16D show schematically down scaling and up scaling of the reference image and the reference image grid.

Then is carried out step 418 of aligning, by the identification server system 50, the target image to the down scaled reference image for providing an initial image alignment of the target image 70 to the reference image 70. The down scaled reference image 60 with the down scaled reference image grid 100 is shown in FIG. 16A.

Figure 16B:
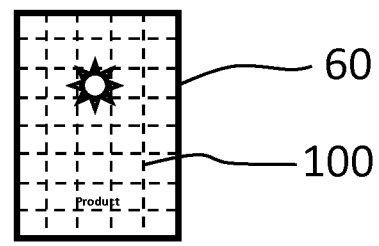

Then, step 420 comprises scaling up, by the identification server system 50, the down scaled reference image 60 together with the down scaled reference image grid 100 for forming a first up scaled reference image 60 with a first up scaled reference image grid 100. The first up scaled reference image 60 with the first up scaled reference image grid 100 is shown in FIG. 16B.

The target image is then aligned, by the identification server system 50, to the first up scaled reference image for providing a first image alignment of the target image 70 to the reference image 60 or first aligned target image 71.

Figure 16C:
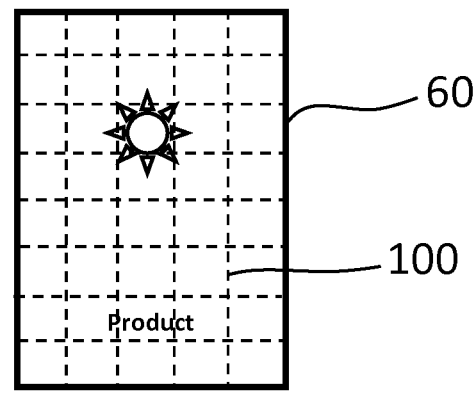
Figure 16D:
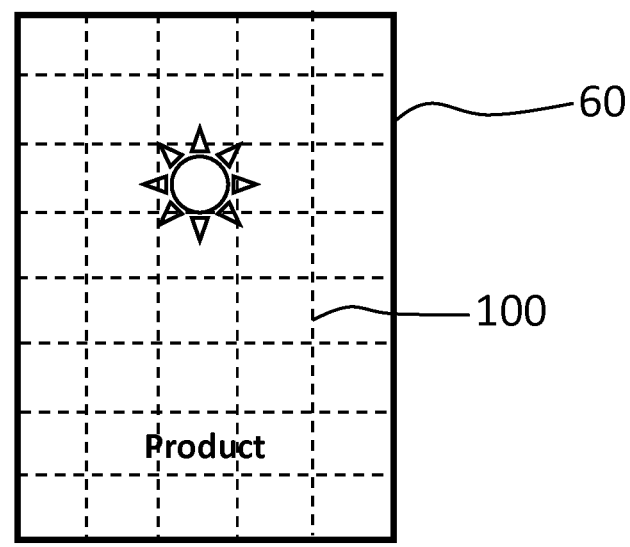

The steps 420 and 422 may be repeated one or more times for providing subsequent or successive image alignments the target image 70 to the reference image 60, as shown in FIGS. 16C and 16D.

Accordingly, the initial alignment of the target image to the down scaled reference image provides a coarse alignment. Then up scaling the reference image 60 and the reference image grid 100 gradually and aligning the target image to the up scaled reference image in steps 422 between the up scaling steps 420 provides iterative alignment in which the alignment of the target image 70 to the reference image 60 becomes gradually more and more accurate.

In one embodiment, the reference image 60 and the reference image grid 100 are first downscaled to $\frac{1}{24}$ of the original size of the reference image 60, then up scaled to $\frac{1}{12}$ of the original size of the reference image 60, then to $\frac{1}{4}$ of the original size of the reference image 60, and then further up scaled to the original size of the reference image 60.

Figure 17:
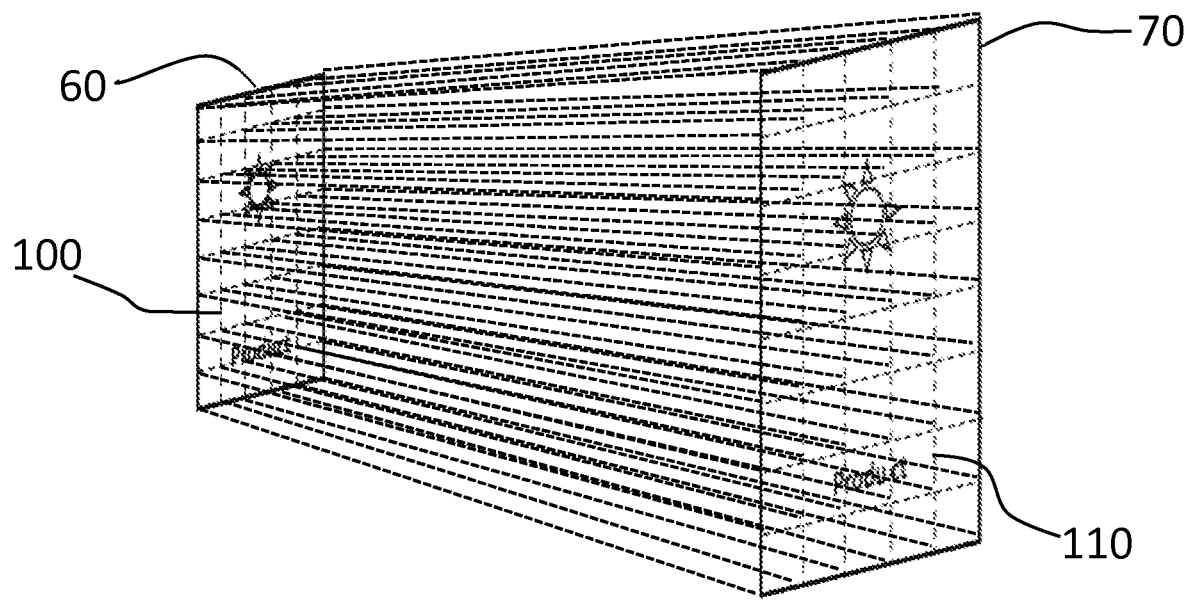
FIG. 17 shows schematically image aligning a down scaled reference image and the target image by utilizing the grids.

FIG. 17 shows schematically one alignment of the target image 70 to the reference image 60 which is scaled down relative to the original size of the reference image 60. The final alignment of the target image may be carried out to the original size reference image as shown in FIG. 14.

In one embodiment, the aligning of the target image to the reference image comprises the steps 410, 412 and 416 as shown in FIG. 15 and as disclosed above. Then, the step 418 comprises aligning, by the identification server system 50, the target image to the down scaled reference image by moving the target grid points 113 of the target image grid 110 for providing the initial alignment. Next the step 420 is carried out by scaling up, by the identification server system 50, the down scaled reference image 60 together with the down scaled reference image grid 100 for forming the first up scaled reference image with the first up scaled reference image grid 110. Then, the step 422 comprises aligning, by the identification server system 50, the target image to the first up scaled reference image by moving the target grid points 110 of the target image grid 100.

The steps 420 and 422 may be repeated one or more times for providing subsequent or successive image alignments the target image 70 to the reference image 60.

Accordingly, the initial alignment of the target image to the down scaled reference image provides a coarse alignment. Then up scaling the reference image 60 and the reference image grid 100 gradually and aligning the target image to the up scaled reference image in steps 422 between the up scaling steps 420 provides iterative alignment in which the alignment of the target image 70 to the reference image 60 becomes gradually more and more accurate.

The above concerns image aligning the target image to the reference image. In some embodiments, the step 400 of aligning the target image to the reference image may further comprise color aligning, by the identification server system 50, the target image or the aligned target image to the reference image. Thus, the colors of the target image are aligned to the colors of the reference image or to correspond the colors of the reference image. This may comprise analysing the colors of the reference image and color aligning the target image based on the analysis. The color aligning may be carried out for example with a color aligning machine learning algorithm, color aligning neural network or a color aligning filter(s) or the like. Further, the color aligning to the reference image may also be carried out to the one or more input images in addition to or instead of the target image. Color aligning the input image(s) is carried out before generating the target image.

Further, in some embodiments, the step 400 of aligning the target image to the reference image may further comprise size aligning, by the identification server system 50, the target image or the aligned target image to the reference image. Thus, the size of the target image is aligned to the size of the reference image or to correspond the size of the reference image. This may comprise analysing the size of the reference image and size aligning the target image based on the analysis. The size aligning may be carried out for example with a size aligning machine learning algorithm, size aligning neural network or the like. Further, the size aligning to the reference image may also be carried out to the one or more input images in addition to or instead of the target image. Size aligning the input image(s) is carried out before generating the target image.

The aligned target image 71 and the reference image 60, or the similarly the at least one aligned sub-part of the target image 71 and the corresponding sub-parts of the reference image 60 are analysed relative to each other for identifying authenticity object to be identified, as defined in step 500 of FIGS. 5, 6, 8 and 9.

In some embodiments, the step 500 comprises comparing, by the identification server system 50, the aligned target image 71 to the aligned reference image 60 by utilizing statistical methods for identifying authenticity of the object.

In alternative embodiments, the step 500 comprises comparing, by the identification server system 50, the at least one of the one or more aligned sub-parts of the target image 71 to the at least one corresponding sub-part of the reference image 60 by utilizing statistical methods for identifying authenticity of the object.

In some embodiments, the statistical method or statistical analysis algorithm for comparing the aligned target image 7 to the reference image comprise one of the following: linear regression analysis, resampling methods, subset selection, shrinkage, dimension reduction, non-linear models, tree-based methods, standard deviation, or the like. The statistical methods may comprise linear methods, non-linear methods or numerical algorithms.

In some embodiments, the statistical methods comprise statistical analysis in pixel-to-pixel manner between the reference image and the input image.

Further, the pixel-to-pixel analysis comprises analysis pixel-to-pixel distance in the input image and in the reference image. A threshold may be used determine number of erroneous pixels in the input image in relation to the reference image for identifying authenticity. Further, a product specific threshold for acceptable number of erroneous pixels may be pre-determined. Thus, the analysis results are compared to the threshold for determining the authenticity.

In alternative embodiments, the step 500 of analysing the aligned target image 71 in relation to the aligned reference image 60 comprises maintaining, in the identification server system 50, a machine learning identification algorithm or an identification neural network, and comparing, by the identification server system 50, the aligned target image to the aligned reference image by utilizing the machine learning identification algorithm or the identification neural network.

In further alternative embodiments, the step 500 of analysing the aligned target image 71 in relation to the aligned reference image 60 comprises maintaining, in the identification server system 50, a machine learning identification algorithm or an identification neural network, and comparing, by the identification server system 50, the at least one of the one or more aligned sub-parts of the target image to the at least one corresponding sub-part of the reference image by utilizing machine learning identification algorithm or the identification neural network.

Figure 10:
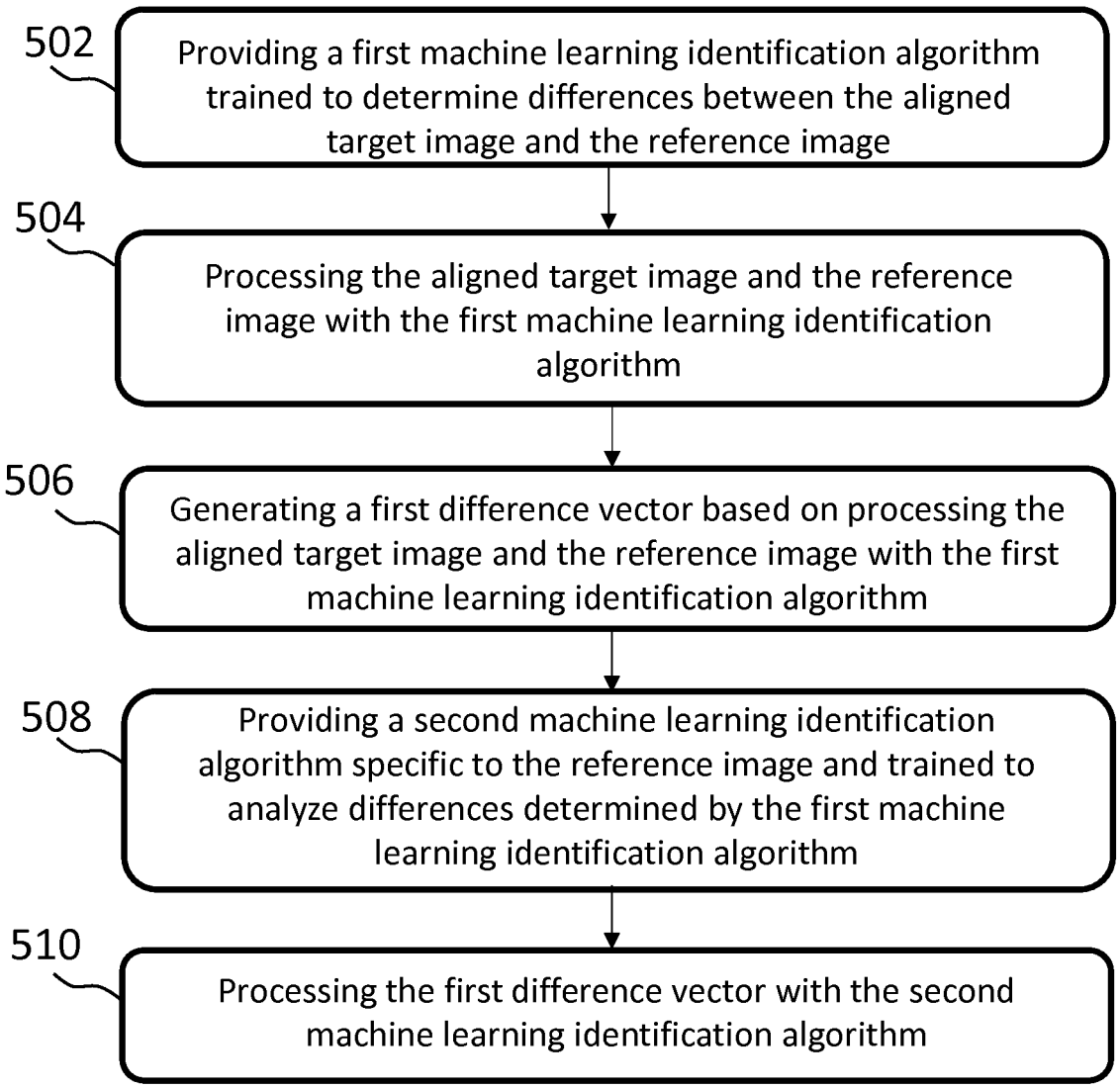

FIG. 10 shows one embodiment of the step 500 in which machine learning algorithms are used for identifying authenticity of the object.

In the embodiment of FIG. 10, the analysing comprises step 502 of providing, in the identification server system 50, a first machine learning identification algorithm trained to determine differences between the aligned target image and the aligned reference image. The aligned target image and the aligned reference image are processed, by the identification server system 50, with the first machine learning identification algorithm in step 504, and then in step 506 a first difference vector is generated, by the identification server system 50, by utilizing the first machine learning identification algorithm. The embodiment of FIG. 10 further comprises step 508 of providing a second machine learning identification algorithm specific to the reference image and trained to analyse the differences determined by the first machine learning identification algorithm in relation to the reference image. In step 510, the first difference vector is processed, by the identification server system 50, with the second machine learning identification algorithm specific to the reference image for identifying authenticity of the object.

Accordingly, first the differences between the aligned target image and the aligned reference image are analysed and the first difference vector is generated. Then, it is analysed if the differences defined with the first difference vector are significant or important for the reference image in question. Some differences may be acceptable and some not.

In an alternative embodiment of the FIG. 10, the analysing of step 500 comprises step 502 of providing, in the identification server system 50, a first identification neural network trained to determine differences between the aligned target image and the aligned reference image. The aligned target image and the aligned reference image are processed, by the identification server system 50, with the first identification neural network in step 504, and then in step 506 a first difference vector is generated, by the identification server system 50, by utilizing the first identification neural network. The embodiment of FIG. 10 further comprises step 508 of providing a second identification neural network specific to the reference image and trained to analyse the differences determined by the first identification neural network in relation to the reference image. In step 510, the first difference vector is processed, by the identification server system 50, with the second identification neural network specific to the reference image for identifying authenticity of the object.

In a further alternative embodiment of FIG. 10, the analysing step 500 comprises step 502 of providing, in the identification server system 50, a first machine learning identification algorithm trained to determine differences between an aligned sub-part of the target image and a corresponding aligned sub-part of the reference image. The aligned sub-part of the target image and the corresponding aligned sub-part of the reference image are processed, by the identification server system 50, with the first machine learning identification algorithm in step 504, and then in step 506 a first difference vector is generated, by the identification server system 50, by utilizing the first machine learning identification algorithm. The embodiment of FIG. 10 further comprises step 508 of providing a second machine learning identification algorithm specific to the one or more sub-parts of the reference image and trained to analyse the differences determined by the first machine learning identification algorithm in relation to each of the one or more sub-parts of the reference image. In step 510, the first difference vector is processed, by the identification server system 50, with the second machine learning identification algorithm specific to the one or more sub-parts of the reference image, respectively, for identifying authenticity of the object.

In a yet alternative embodiment of FIG. 10, the analysing step 500 comprises step 502 of providing, in the identification server system 50, a first identification neural network trained to determine differences between an aligned sub-part of the target image and a corresponding aligned sub-part of the reference image. The aligned sub-part of the target image and the corresponding aligned sub-part of the reference image are processed, by the identification server system 50, with the first identification neural network in step 504, and then in step 506 a first difference vector is generated, by the identification server system 50, by utilizing the first identification neural network. The embodiment of FIG. 10 further comprises step 508 of providing a second identification neural network specific to the one or more sub-parts of the reference image and trained to analyse the differences determined by the first identification neural network in relation to each of the one or more sub-parts of the reference image. In step 510, the first difference vector is processed, by the identification server system 50, with the second identification neural network specific to the one or more sub-parts of the reference image, respectively, for identifying authenticity of the object.

The method of the present invention may further comprise excluding certain areas of the target image and/or the reference image from the analysis and from step 500. This exclusion of the certain areas is carried out before analysing the aligned target image in relation to the reference image. Thus, the exclusion may be carried out in the aligning step 400 or in the analysing step 500 before the analysis.

In one embodiment, the method comprises, carried out before the analysis, excluding, by the identification server system, a predetermined area of the aligned target image from the analysing of the aligned target image in relation to the aligned reference image. Accordingly, unwanted or changing parts or areas of the target image may be excluded from the analysing of the authenticity.

In another embodiment, the method comprises, carried out before the analysis, applying, by the identification server system, a mask on a predetermined area of the aligned target image and on a corresponding predetermined area of the reference image for excluding the predetermined area from the analysing of the aligned target image in relation to the aligned reference image. Accordingly, the mask excludes the predetermined area from the analysing. The mask applied to the aligned target image and the reference image are preferably identical such that the analysis is not affected by the masks.

Figure 18:
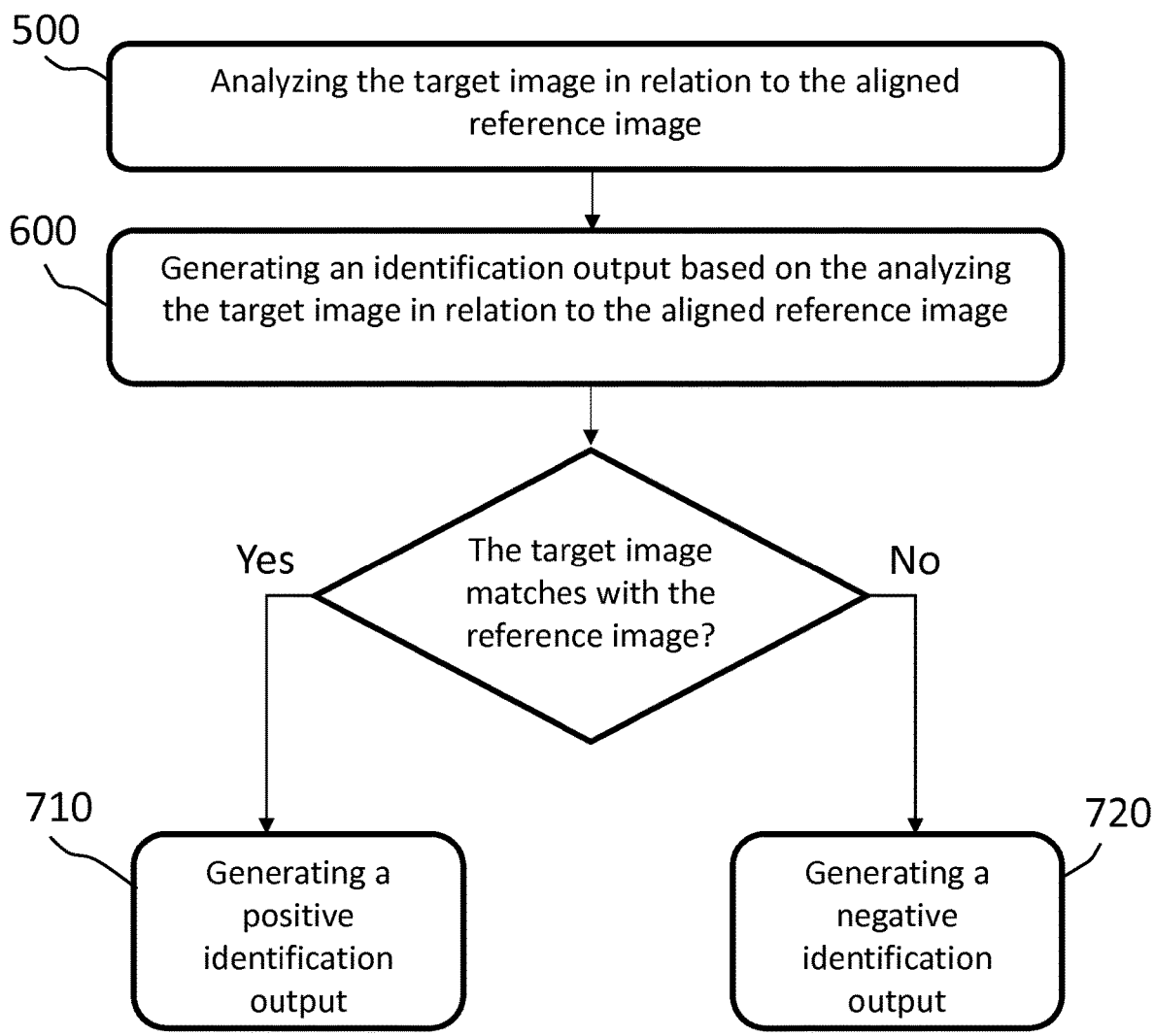
FIG. 18 shows schematically a flow chart of different embodiment according to the method of the present invention.

FIG. 18 shows a further embodiment or further features of the present invention. The method comprises step 600 of generating an identification output based on the analysing of the aligned target image in relation to the aligned reference image. The step 600 is carried out after step 500. The step 600 further provides different identification output based on whether the aligned target image matches with the reference image, meaning whether the object to be identified matches with the original object. If the aligned target image matches with the reference image a positive identification output is generated in step 710. If the aligned target image does not match with the reference image a negative identification output is generated in step 720.

The identification output may be simple "Yes" or "No" output. Alternatively, the identification output may be match score determined by the steps 500 and 600 defining how well the aligned target image matches with the reference image.

The invention has been described above with reference to the examples shown in the figures. However, the invention is in no way restricted to the above examples but may vary within the scope of the claims.

The invention claimed is:

1. A method for identifying authenticity of an object, wherein the method comprises the steps of:
   a) maintaining, in an identification server system, a reference image of an original object, the reference image is provided to represent an equivalent original object;
   b) receiving, in the identification server system, one or more input images of the object to be identified;
   c) generating, by the identification server system, a target image from the at least one of the one or more input images;
   d) aligning, by the identification server system, the target image to the reference image by distorting the target image; and
   e) analysing, by the identification server system, the aligned target image in relation to the reference image for identifying authenticity of the object,
   wherein step e) comprises:
      maintaining, in the identification server system, a machine learning identification algorithm or an identification neural network, and comparing, by the identification server system, the aligned target image to the reference image by utilizing the machine learning identification algorithm or the identification neural network;
      providing, in the identification server system, a first machine learning identification algorithm, or a first identification neural network, trained to determine differences between the aligned target image and the reference image, and a second machine learning identification algorithm, or a second identification neural network, specific to the reference image and trained to analyse the differences determined by the first machine learning identification algorithm, or the first identification neural network, in relation to the reference image;

processing, by the identification server system, the aligned target image and the reference image with the first machine learning identification algorithm, or with the first identification neural network, and generating, by the identification server system, a first difference vector by utilizing the first machine learning identification algorithm, or the first identification neural network; and processing, by the identification server system, the first difference vector with the second machine learning identification algorithm, or with the second identification neural network, specific to the reference image for identifying authenticity of the object.

2. The method according to claim 1, wherein the step d) aligning, by the identification server system, the target image to the reference image by distorting comprises adjusting the target image to match the reference image.

3. The method according to claim 1, wherein:
the method further comprises step f) carried out before step e):
f) defining, by the identification server system, one or more sub-parts in the aligned target image; or
the method further comprises step f) carried out before step e):
f) defining, by the identification server system, one or more sub-parts in the target image, and that
the step d) comprises aligning, by the identification server system, at least one of the one or more sub-parts of the target image to at least one corresponding sub-part of the reference image.

4. The method according to claim 3, wherein the step f) comprises:
dividing, by the identification server system, the aligned target image into two or more sub-parts; or
maintaining, in the identification server system, the reference image of the original object, the reference image being pre-divided into two or more sub-parts; and
dividing, by the identification server system, the aligned target image into two or more sub-parts based on the pre-divided sub-parts of the reference image; or
dividing, by the identification server system, the reference image into two or more sub-parts; and
dividing, by the identification server system, the aligned target image into two or more sub-parts based on the sub-parts of the reference image.

5. The method according to claim 1, wherein the aligning in step d) comprises image aligning:
recognizing, by the identification server system, corresponding locations in the target image and in the reference image; and
aligning, by the identification server system, the corresponding locations in the target image and in the reference image to each other by distorting the target image; or
recognizing, by the identification server system, corresponding locations in at least one of the one or more sub-parts of the target image and in at least one corresponding sub-part of the reference image; and
aligning, by the identification server system, the corresponding locations in the at least one of the one or more sub-parts of the target image and in the at least one corresponding sub-part of the reference image to each other by distorting the at least one of the one or more sub-parts of the target image, for image aligning the at least one of the one or more sub-parts of the target image and the at least one corresponding sub-part of the reference image.

6. The method according to claim 1, wherein the aligning in step d) comprises image aligning:
associating, by the identification server system, a reference image grid on the reference image;
associating, by the identification server system, a target image grid on the target image or the at least one of the one or more input images; and
aligning, by the identification server system, the target image to the reference image by adjusting the target image grid in relation to the reference image grid for aligning the target image to the reference image; or
associating, by the identification server system, a reference image grid on the reference image;
associating, by the identification server system, a target image grid on the target image or the at least one of the one or more input images; and
aligning, by the identification server system, the target image to the reference image by distorting the target image grid in relation to the reference image grid for aligning the target image to the reference image.

7. The method according to claim 6, wherein the reference image grid comprise reference grid points and the target image grid comprises target grid points, and that the step d) aligning, by the identification server system, the target image to the reference image further comprises:
adjusting, by the identification server system, the target grid points of the target image grid in relation to the corresponding reference grid points of the reference image grid by moving the target grid points of the target image grid for distorting the target image or;
adjusting, by the identification server system, the target grid points of the target image grid in relation to each other and in relation to the corresponding reference grid points of the reference image grid by moving the target grid points of the target image grid for distorting the target image.

8. The method according to claim 7, wherein:
the step d) aligning, by the identification server system, comprises iteratively aligning the target image to the reference image by iteratively moving the target grid points of the target image grid for distorting the target image; or
the step d) aligning, by the identification server system, the target image to the reference image further comprises:
aligning, by the identification server system, the target image to the reference image by moving the target grid points of the target image grid for distorting the target image;
verifying, by the identification server system, aligning of the target image to the reference image; and
iteratively aligning, by the identification server system, the target image to the reference image by iteratively moving the target grid points of the target image grid for distorting the target image; or
the step d) aligning, by the identification server system, the target image to the reference image further comprises:
aligning, by the identification server system, the target image to the reference image by moving the target grid points of the target image grid for distorting the target image;

carrying out step e), by the identification server system, analysing by the identification server system, the aligned target image in relation to the reference image;

iteratively aligning in step d), by the identification server system, the target image to the reference image by iteratively moving the target grid points of the target image grid for distorting the target image.

9. A method for identifying authenticity of an object, wherein the method comprises the steps of:
a) maintaining, in an identification server system, a reference image of an original object, the reference image is provided to represent an equivalent original object;
b) receiving, in the identification server system, one or more input images of the object to be identified;
c) generating, by the identification server system, a target image from the at least one of the one or more input images;
d) aligning, by the identification server system, the target image to the reference image by distorting the target image; and
e) analysing, by the identification server system, the aligned target image in relation to the reference image for identifying authenticity of the object,
wherein the aligning in step d) comprises image aligning;
associating, by the identification server system, a reference image grid on the reference image;
associating, by the identification server system, a target image grid on the target image or the at least one of the one or more input images; and
aligning, by the identification server system, the target image to the reference image by adjusting the target image grid in relation to the reference image grid for aligning the target image to the reference image; or
associating, by the identification server system, a reference image grid on the reference image;
associating, by the identification server system, a target image grid on the target image or the at least one of the one or more input images; and
aligning, by the identification server system, the target image to the reference image by distorting the target image grid in relation to the reference image grid for aligning the target image to the reference image;
comprises:
scaling down, by the identification server system, the reference image together with the reference image grid for forming a down scaled reference image with a down scaled reference image grid;
aligning, by the identification server system, the target image grid to the down scaled reference image grid for providing an initial image alignment of the target image to the reference image;
scaling up, by the identification server system, up the down scaled reference image together with the down scaled reference image grid for forming a first up scaled reference image with a first up scaled reference image grid; and
aligning, by the identification server system, the target image grid to the first up scaled reference image grid for providing a first image alignment of the target image to the reference image; or
scaling down, by the identification server system, the reference image together with the reference image grid for forming a down scaled reference image with a down scaled reference image grid;

aligning, by the identification server system, the target image grid to the down scaled reference image grid for providing an initial image alignment of the target image to the reference image;
scaling up, by the identification server system, the down scaled reference image together with the down scaled reference image grid for forming a first up scaled reference image with a first up scaled reference image grid;
aligning, by the identification server system, the target image grid to the first up scaled reference image grid for providing a first image alignment of the target image to the reference image; and
repeating one or more times, by the identification server system, the up scaling of the reference image together with the reference image grid and aligning the target image grid to the up scaled reference image grid for providing a first image alignment of the target image to the reference image.

10. The method according to claim 9, wherein the step d) aligning, by the identification server system, the target image to the reference image further comprises:
scaling, by the identification server system, down the reference image together with the reference image grid for forming a down scaled reference image with a down scaled reference image grid;
aligning, by the identification server system, the target image to the down scaled reference image by moving the target grid points of the target image grid;
scaling up, by the identification server system, up the down scaled reference image together with the down scaled reference image grid for forming a first up scaled reference image with a first up scaled reference image grid; and
aligning, by the identification server system, the target image to the first up scaled reference image by moving the target grid points of the target image grid; or
scaling down, by the identification server system, the reference image together with the reference image grid for forming a down scaled reference image with a down scaled reference image grid;
aligning, by the identification server system, the target image to the down scaled reference image by moving the target grid points of the target image grid;
scaling up, by the identification server system, the down scaled reference image together with the down scaled reference image grid for forming a first up scaled reference image with a first up scaled reference image grid;
aligning, by the identification server system, the target image to the first up scaled reference image by moving the target grid points of the target image grid; and
repeating one or more times, by the identification server system, the up scaling of the reference image together with the reference image grid and aligning the target image to the up scaled reference image for providing image alignment of the target image to the reference image.

11. The method according to claim 1, wherein:
the step b) comprises receiving, in the identification server system, two or more input images of the object to be identified; and
the step c) comprises selecting, by the identification server system, one of the two or more input images as the target image; or the step b) comprises receiving, in the identification server system, two or more input images of the object to be identified;

the step c) comprises comparing, by the identification server system, the two or more input images to the reference image; and the step c) further comprises selecting, by the identification server system, one of the two or more input images as the target image based on the comparison.

12. A method for identifying authenticity of an object, wherein the method comprises the steps of:
   a) maintaining, in an identification server system, a reference image of an original object, the reference image is provided to represent an equivalent original object;
   b) receiving, in the identification server system, one or more input images of the object to be identified;
   c) generating, by the identification server system, a target image from the at least one of the one or more input images;
   d) aligning, by the identification server system, the target image to the reference image by distorting the target image; and
   e) analysing, by the identification server system, the aligned target image in relation to the reference image for identifying authenticity of the object, wherein:

the step b) comprises receiving, in the identification server system, two or more input images of the object to be identified; and the step c) comprises aligning, by the identification server system, at least two of the two or more input images with respect to the reference image and generating, by the identification server system, the target image by combining the at least two of the two or more aligned input images as the target image; or the step b) comprises receiving, in the identification server system, two or more input images of the object to be identified; and the step c) comprises aligning, by the identification server system, at least two of the two or more input images with respect to one of the input images and generating, by the identification server system, the target image by combining the at least two of the two or more aligned input images as the target image, the alignment being carried out so the one input image as the reference image.

13. The method according to claim 1, wherein:

the step b) comprises receiving, in the identification server system, two or more input images of the object to be identified;

the step c) comprising:

aligning, by the identification server system, at least two of the two or more input images with respect to one of the input images, dividing, by the identification server system, the at least two of the two or more input images into two or more sub-parts;

selecting, by the identification server system, at least two of the two or more sub-parts; and generating, by the identification server system, the target image by combining the selected sub-parts as the target image; or the step b) comprises receiving, in the identification server system, two or more input images of the object to be identified;

the step c) comprising:

aligning, by the identification server system, at least two of the two or more input images with respect to one of the input images, dividing, by the identification server system, the at least two of the two or more input images into two or more sub-parts;

comparing, by the identification server system, the two or more sub-parts of the input images to corresponding sub-parts of the reference image;

selecting, by the identification server system, at least two of the two or more sub-parts based on the comparison; and generating, by the identification server system, the target image by combining the selected sub-parts as the target image.

14. The method according to claim 1, wherein the step d) comprises:

extracting, by the identification server system, an input object image from the one or more input images or from the target image, the target image consisting of the input object image, the input object image conforming contour of the object; or extracting, by the identification server system, an input object image from the one or more input images or from the target image and removing, by the identification server system, the background for forming the target image, the target image consisting of the input object image, the input object image conforming contour of the object.

15. The method according to claim 1, wherein that:

the step c) comprises size aligning, by the identification server system, the one or more input images to the reference image; or the step c) or the step d) comprises size aligning, by the identification server system, the target image to the reference image.

16. The method according to claim 1, wherein:

the step c) comprises color aligning, by the identification server system, the one or more input images to the reference image; or the step c) or step d) comprises color aligning, by the identification server system, the target image to the reference image.

17. The method according to claim 1, wherein the method further comprises before step e):

excluding, by the identification server system, a predetermined area of the aligned target image from the analysing of the aligned target image in relation to the reference image; or applying, by the identification server system, a mask on a predetermined area of the aligned target image and on a corresponding predetermined area of the reference image for excluding the predetermined area from the analysing of the aligned target image in relation to the reference image.

* * * * *